US010836971B2

(12) United States Patent
Small et al.

(10) Patent No.: US 10,836,971 B2
(45) Date of Patent: Nov. 17, 2020

(54) SYSTEM AND METHOD FOR FORMING A SOLID FUEL ELEMENT

(71) Applicant: ERS FUEL INC., St. Marys (CA)

(72) Inventors: John Mark Small, Stratford (CA); Douglas Robert Bird, Hertfordshire (GB); James Douglas Bird, Lincolnshire (GB)

(73) Assignee: ERS Fuel, Inc., Ontario (CA)

( * ) Notice: Subject to any disclaimer, the term of this patent is extended or adjusted under 35 U.S.C. 154(b) by 0 days.

(21) Appl. No.: 16/304,565

(22) PCT Filed: May 26, 2017

(86) PCT No.: PCT/CA2017/050641
§ 371 (c)(1),
(2) Date: Nov. 26, 2018

(87) PCT Pub. No.: WO2017/201628
PCT Pub. Date: Nov. 30, 2017

(65) Prior Publication Data
US 2019/0292475 A1    Sep. 26, 2019

Related U.S. Application Data

(60) Provisional application No. 62/341,798, filed on May 26, 2016.

(51) Int. Cl.
*C10L 5/14* (2006.01)
*C10L 5/36* (2006.01)
*C10L 5/44* (2006.01)

(52) U.S. Cl.
CPC .................. *C10L 5/14* (2013.01); *C10L 5/146* (2013.01); *C10L 5/365* (2013.01); *C10L 5/442* (2013.01);
(Continued)

(58) Field of Classification Search
CPC .. C10L 5/14; C10L 5/365; C10L 5/442; C10L 5/146; C10L 2250/06;
(Continued)

(56) References Cited

U.S. PATENT DOCUMENTS

| 1,990,631 A | 2/1935 | Bowling |
| 1,990,632 A * | 2/1935 | Bowling ................. B30B 11/00 44/567 |

(Continued)

FOREIGN PATENT DOCUMENTS

| AU | 2003246075 | 4/2004 |
| EP | 2508263 | 10/2012 |
| GB | 397568 | 8/1933 |

OTHER PUBLICATIONS

Extended European Search report for European Patent Application No. 17801678.4, dated Dec. 13, 2019, 10 pages.
(Continued)

*Primary Examiner* — Cephia D Toomer
(74) *Attorney, Agent, or Firm* — Sheridan Ross P.C.

(57) ABSTRACT

A system for forming a woody biomass component and a binder component into a solid fuel element having a predetermined density. The system includes a first compression assembly for compressing an uncompressed mixture of the woody biomass component and the binder component to provide a first compressed mixture formed into a preliminary element having a preliminary density. The system also includes a second compression assembly for compressing the preliminary element to form the solid fuel element having the predetermined density, which is greater than the preliminary density.

14 Claims, 20 Drawing Sheets

(52) U.S. Cl.
CPC ....... *C10L 2250/06* (2013.01); *C10L 2290/06* (2013.01); *C10L 2290/24* (2013.01); *C10L 2290/30* (2013.01); *C10L 2290/50* (2013.01); *C10L 2290/52* (2013.01); *C10L 2290/58* (2013.01); *C10L 2290/60* (2013.01); *Y02E 50/10* (2013.01); *Y02E 50/30* (2013.01)

(58) Field of Classification Search
CPC ............ C10L 2290/06; C10L 2290/24; C10L 2290/30; C10L 2290/50; C10L 2290/52; C10L 2290/58; C10L 2290/60
See application file for complete search history.

(56) References Cited

U.S. PATENT DOCUMENTS

2010/0293846 A1* 11/2010 Shaffer .................. B30B 9/067
44/589
2013/0319261 A1  12/2013 Kelly et al.

OTHER PUBLICATIONS

International Search Report and Written Opinion prepared by the Canadian Intellectual Property Office dated Aug. 17, 2017, for International Application No. PCT/CA2017/050641.

\* cited by examiner

SYSTEM AND METHOD FOR FORMING A SOLID FUEL ELEMENT

CROSS-REFERENCE TO RELATED APPLICATION

This application is a national stage application under 35 U.S.C. 371 and claims the benefit of PCT Application No. PCT/CA2017/050641 having an international filing date of 26 May 2017, which designated the United States, which PCT application claimed the benefit of U.S. Provisional Patent Application No. 62/341,798, filed on May 26, 2016, the disclosure of each of which are hereby incorporated herein by reference.

FIELD OF THE INVENTION

The present invention is a system and a method for forming a woody biomass component and a binder component into a solid fuel element having a predetermined density.

BACKGROUND OF THE INVENTION

Pellet fuels, e.g., wood pellets, are burned in various pellet heating appliances, and may be burned in power plants, for generating electricity. The wood pellet typically is formed by compressing wood material (i.e., long fiber cellulose) that has been processed for that purpose.

As is well known in the art, wood pellets have certain disadvantages. For instance, when burned, the wood pellets release fine particulate matter, resulting in air pollution. Also, when manufacturing and handling the wood pellets, moisture content must be carefully controlled.

SUMMARY OF THE INVENTION

For the foregoing reasons, there is a need for a solid fuel element that overcomes or mitigates one or more of the deficiencies of the prior art, and a system and method of forming the solid fuel element. Such deficiencies are not necessarily included in those described above.

In its broad aspect, the invention provides a system for forming a woody biomass component and a binder component into a solid fuel element having a predetermined density. The system includes a first compression assembly for compressing an uncompressed mixture of the woody biomass component and the binder component to provide a preliminary element having a preliminary density. The system also includes a second compression assembly for compressing the preliminary element to form the solid fuel element having the predetermined density, the predetermined density being greater than the preliminary density.

In another of its aspects, the invention provides a system for forming a woody biomass component and a binder component into a solid fuel element having a predetermined density. The system includes a mixer assembly for mixing the woody biomass component and the binder component in predetermined proportions to provide an uncompressed mixture, and a first compression assembly for compressing the uncompressed mixture to provide a first compressed mixture formed into a preliminary element having a preliminary density. The system also includes a fine meter assembly, for delivering one or more predetermined amounts of the uncompressed mixture to the first compression assembly. In addition, the system also includes a second compression assembly for compressing the preliminary element to form the solid fuel element having the predetermined density, the predetermined density being greater than the preliminary density.

In another of its aspects, the invention provides a method of forming a solid fuel element having a predetermined density and including a woody biomass component and a binder component. The method includes compressing an uncompressed mixture of the woody biomass component and the binder component to form a preliminary element having a preliminary density. The preliminary element is further compressed to form the solid fuel element, having the predetermined density. The predetermined density is greater than the preliminary density.

In another of its aspects, the invention provides a method of forming the solid fuel element. The method includes, with the first compression assembly, compressing the uncompressed mixture to form the preliminary element, having the preliminary density. The method also includes further compressing the preliminary element, in the second compression assembly, to form the solid fuel element 26. The solid fuel element has the predetermined density, which is greater than the preliminary density. The solid fuel element is subsequently removed from the second compression assembly.

In another of its aspects, the invention provides a method of forming a solid fuel element having a predetermined density including a woody biomass component and a binder component. The method includes providing the woody biomass component, the woody biomass component comprising woody biomass particles having a predetermined woody biomass particle size distribution, and providing the binder component, the binder component comprising binder particles having a predetermined binder particle size distribution. The woody biomass component and the binder component are mixed together in predetermined proportions relative to each other to provide an uncompressed mixture. Via a fine metering assembly, one or more predetermined amounts of the uncompressed mixture is delivered to a first compression assembly. With the first compression assembly, the predetermined amount of the uncompressed mixture is compressed to provide a preliminary element including a first compressed mixture having a preliminary density. The preliminary element is positioned in a secondary compression assembly. The preliminary element is compressed in the second compression assembly to form the solid fuel element having the predetermined density, the predetermined density being greater than the preliminary density. The solid fuel element is removed from the second compression assembly.

In yet another of its aspects, the invention provides a solid fuel element made of the woody biomass component and the binder component and having the predetermined density, the solid fuel element including a core portion and a plurality of lobes extending radially from the core portion.

BRIEF DESCRIPTION OF THE DRAWINGS

The invention will be better understood with reference to the attached drawings, in which.

DETAILED DESCRIPTION

Figure 1A:
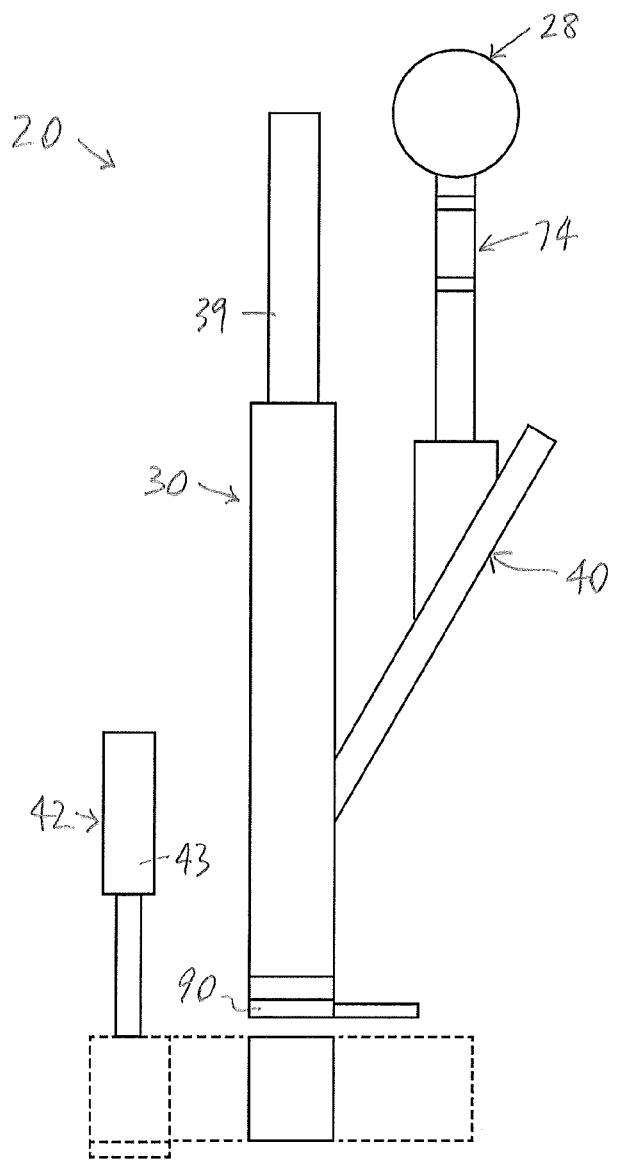
FIG. 1A is a schematic diagram of an embodiment of a system of the invention.
Figure 1B:
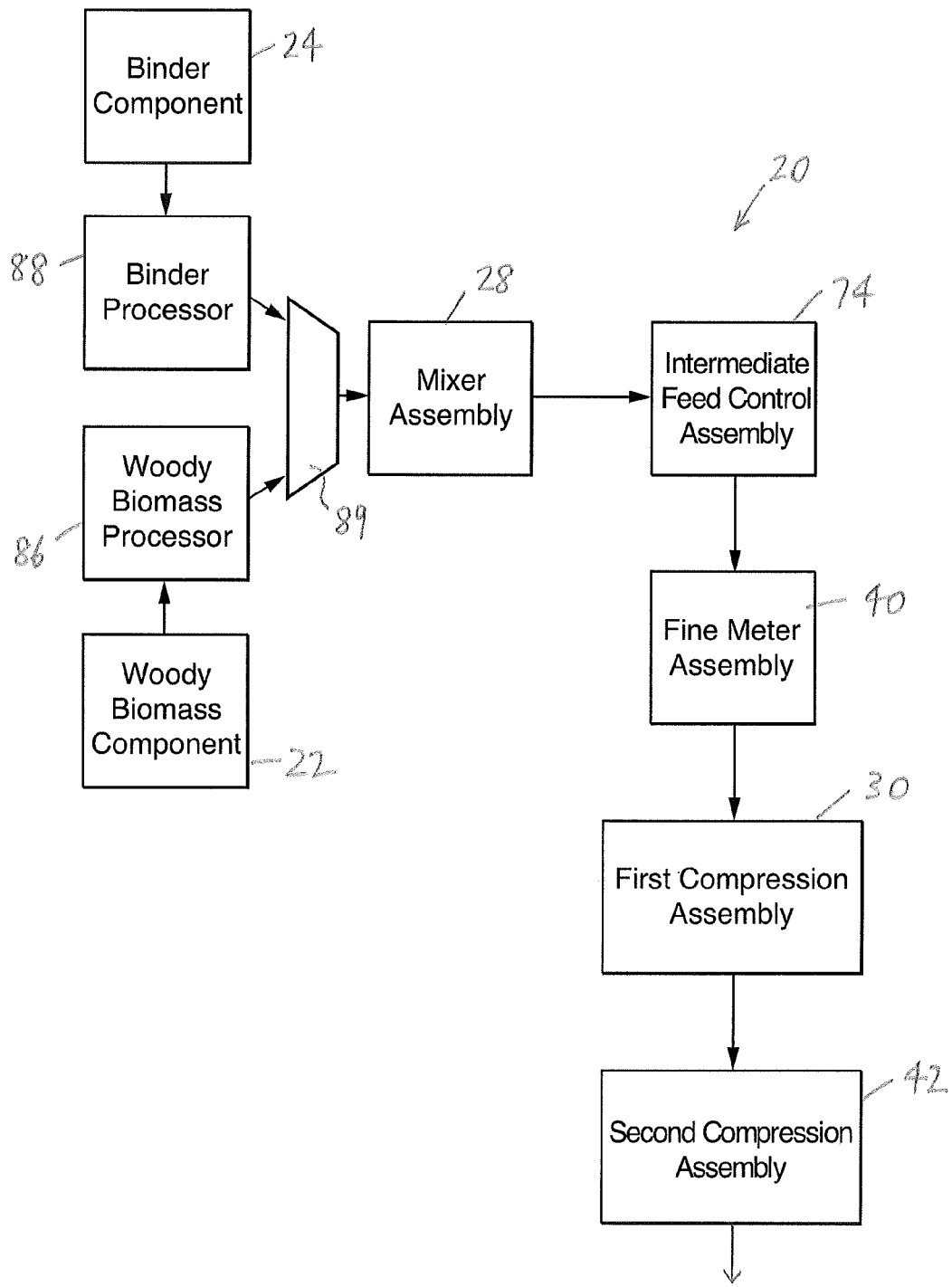
FIG. 1B is a flow chart schematically illustrating an embodiment of a method of the invention.
Figure 2:
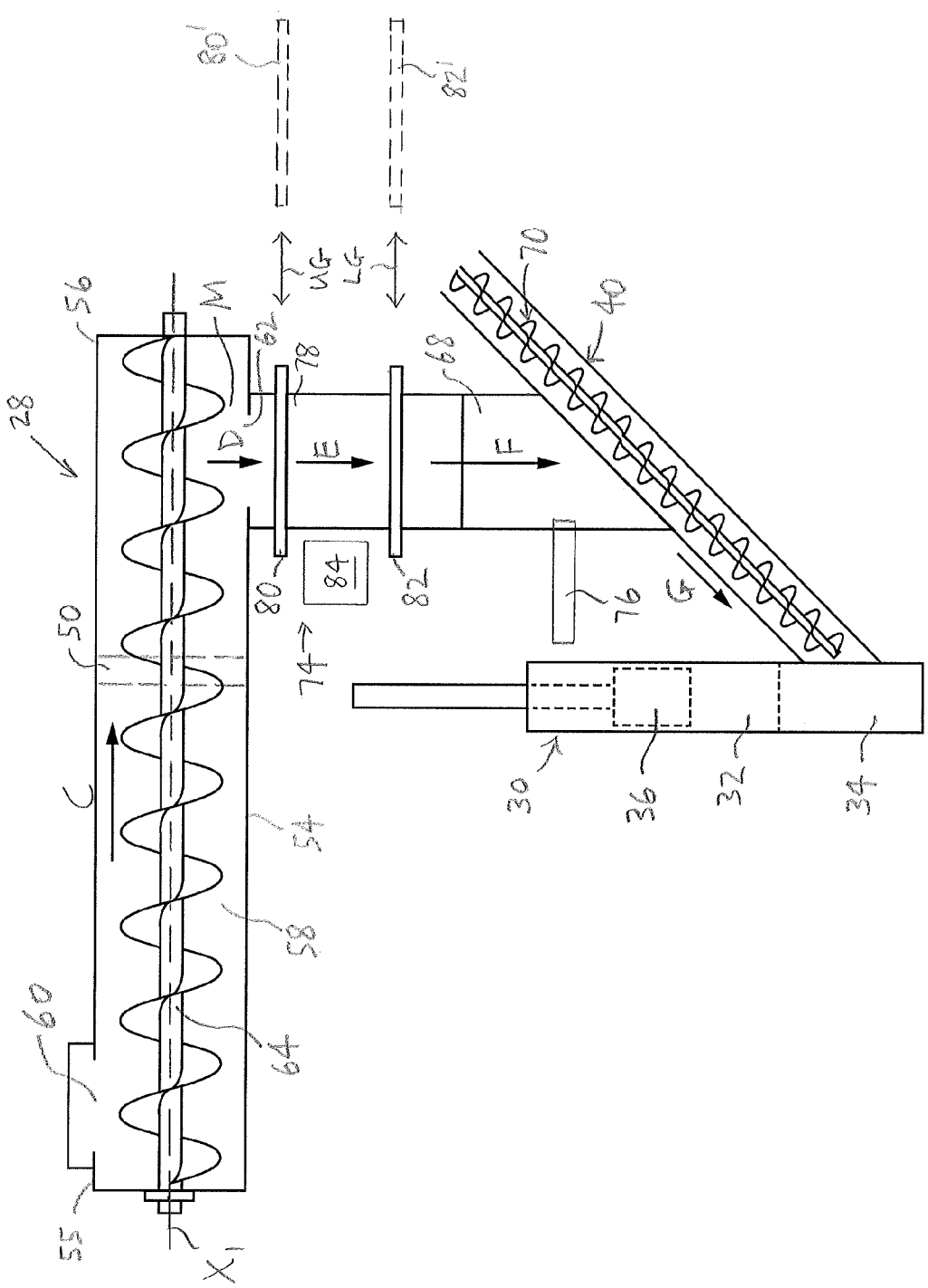
FIG. 2 is a schematic diagram of a portion of the system of FIG. 1A including embodiments of a mixer assembly and a fine meter assembly of the invention, drawn at a smaller scale.
Figure 3A:
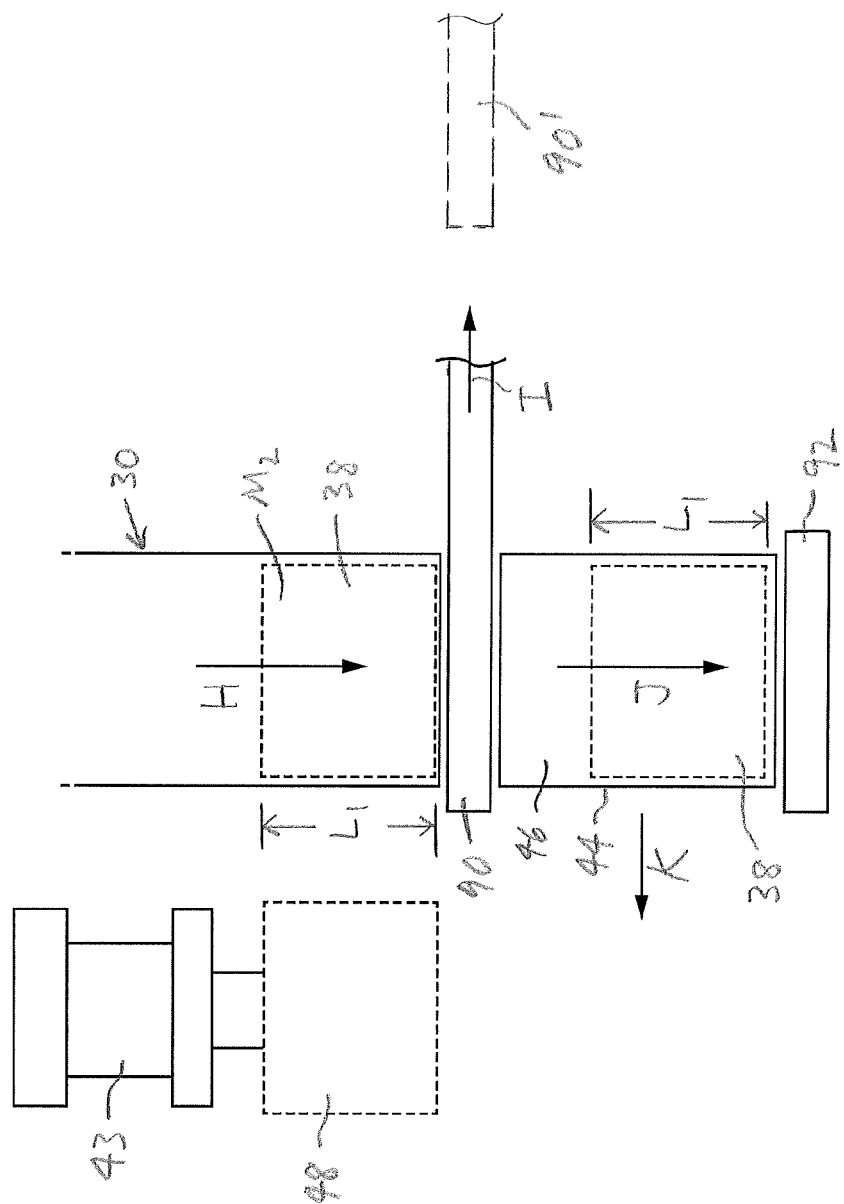
FIG. 3A is a side view of embodiments of first and second compressing assemblies of the invention in which a second cylinder of the second compressing assembly including a second chamber therein is positioned in a first position thereof below a first cylinder including a first chamber of the first compression assembly, drawn at a larger scale.

In the attached drawings, like reference numerals designate corresponding elements throughout. Reference is first made to FIGS. 1A-6D and 9A-9C to describe an embodiment of a system in accordance with the invention indicated generally by the numeral 20. The system 20 is for forming a woody biomass component 22 and a binder component 24 into a solid fuel element 26 (FIGS. 9A-9C) having a predetermined density. In one embodiment, the system 20 preferably includes a mixer assembly 28 (FIGS. 1A, 1B, and 2) for mixing the woody biomass component 22 and the binder component 24 in predetermined proportions to provide an uncompressed mixture "M" (FIG. 2), and a first compression assembly 30 including a first cylinder 32 having a first chamber 34 therein and a first piston 36 movable in the first cylinder 32 (FIG. 2), for compressing the uncompressed mixture "M" in the first chamber 34 to provide a first compressed mixture "$M_2$" formed into a preliminary element 38 (FIG. 3A). As will be described, the preliminary element 38 occupies a first volume, and the preliminary element has a preliminary density.

It is also preferred that the system 20 includes a fine meter assembly 40 for delivering one or more predetermined amounts of the uncompressed mixture "M" to the first chamber 34, and a second compression assembly 42 including a second cylinder 44 having a second chamber 46 therein and a second piston 48 movable in the second cylinder 44 (FIG. 3B), for compressing the preliminary element 38 in the second chamber 46 to provide a final compressed mixture "$M_3$" (FIG. 3C) formed into the solid fuel element 26 occupying a second volume that is less than the first volume. The solid fuel element 26 has the predetermined density, which is greater than the preliminary density.

The first and second pistons 36, 48 may be driven to compress the materials as described above by any suitable means. For example, in one embodiment, the first compression assembly 30 and the second compression assembly 42 preferably include suitable hydraulic cylinders 39, 43 for driving the respective pistons 36, 48.

For the purposes hereof, "woody biomass component" refers to a wide variety of materials, which may include, for example, any one or more of the following: waxy cardboard materials, cardboard, wax, garden and yard waste, paper and paper products, sawdust, wood chips and splinters, natural and/or processed wood materials, organic fibres, cloth, string, hemp, jute, discarded cardboard coffee cups, and other combustible materials. For example, the woody biomass may be disposable coffee cups, after use boxes (waxed or otherwise), after use scrap wood materials from industry (e.g., from the construction industry), urban wood (e.g., bushes, tree branches), scrap or waste material from the forestry industry.

The woody biomass component preferably is provided in the form of woody biomass particles, having a predetermined woody biomass particle size distribution, as will be described.

The binder component may be any suitable material that, when heated to a certain temperature, becomes relatively malleable. The binder component preferably is non-hazardous polyethylene. For the purposes hereof, "non-hazardous polyethylene" refers to any suitable polyethylene that does not emit hazardous materials upon combustion thereof beyond acceptable limits, as determined by the regulatory bodies having jurisdiction. It is contemplated that the woody biomass component is sourced at a landfill site. However, it will be appreciated by those skilled in the art that the woody biomass component may be provided at other facilities. Preferably, the polyethylene used is linear low-density polyethylene (LLDPE). As is known in the art, LLDPE typically includes nitrogen and oxygen. Accordingly, the LLDPE preferably is included because, upon combustion thereof, the LLDPE releases oxygen, thereby promoting combustion. However, those skilled in the art would be aware of various types of non-hazardous polyethylene (hereinafter sometimes referred to as "PE") that would be suitable.

As noted above, the binder component may be any suitable material, e.g., any suitable plastic, or other material such as paraffin.

The binder component, which acts as a binder material in the solid fuel element, preferably is a material that may be waste or is otherwise relatively inexpensive. The binder component may be material otherwise destined for landfill. The binder component preferably is also provided in the form of binder component particles, having a predetermined binder particle size distribution, as will also be described.

Figure 4A:
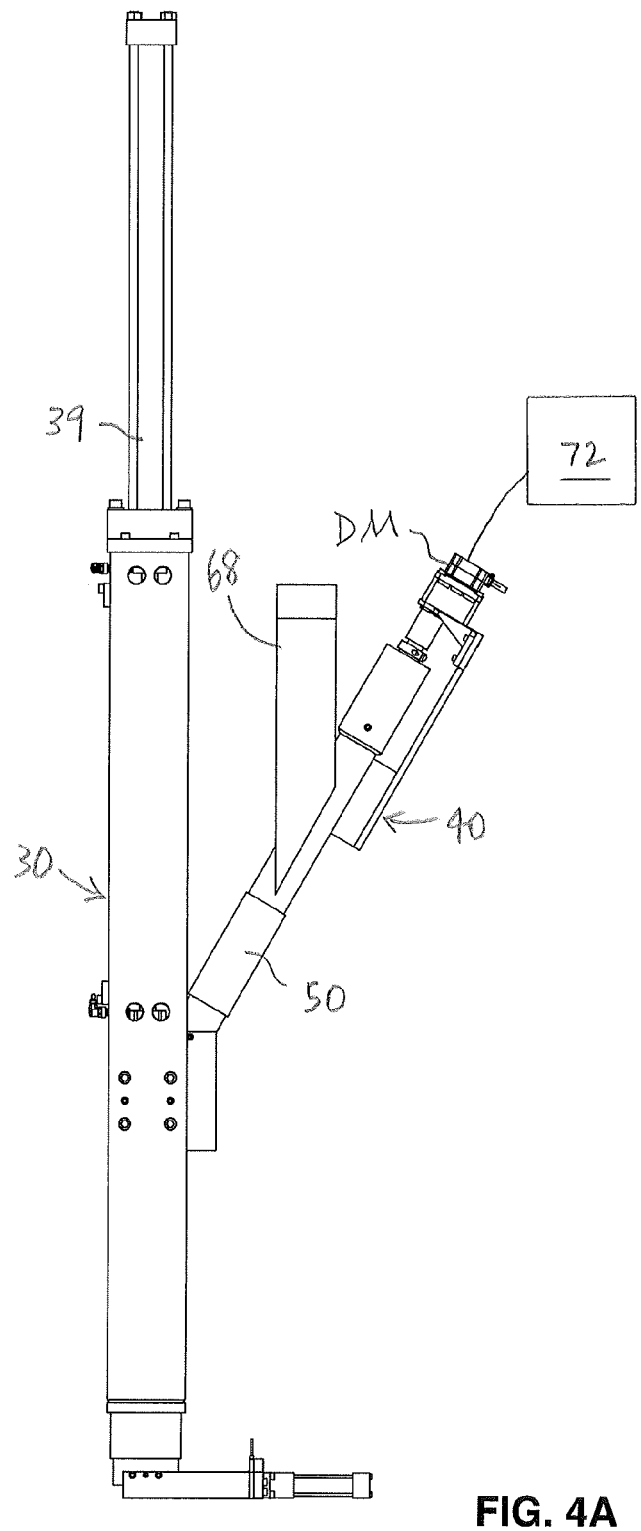
FIG. 4A is a side view of the first compression assembly and the fine metering assembly of the system of FIG. 1A, drawn at a smaller scale.
Figure 4B:
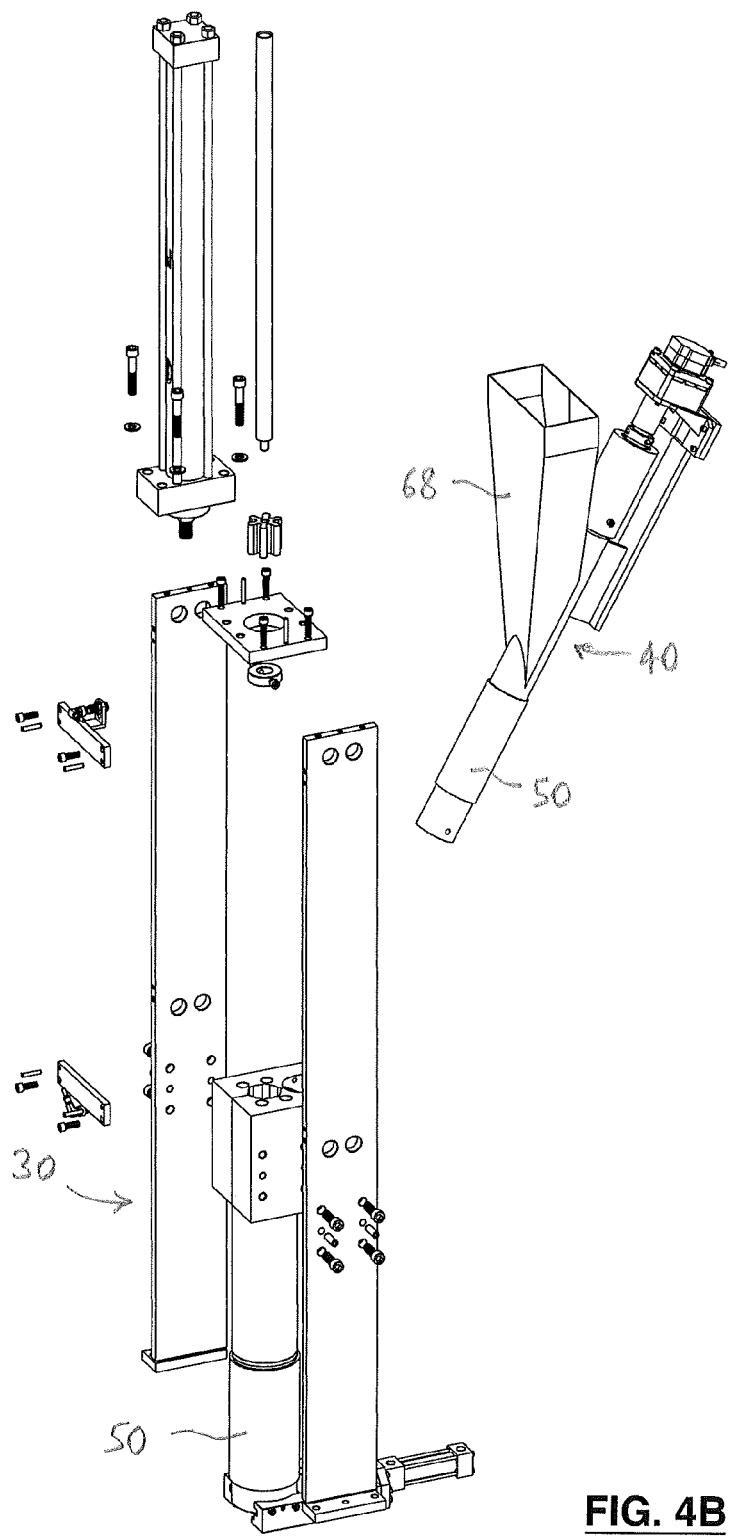
FIG. 4B is an exploded view of the first compression assembly of FIG. 4A.
Figure 5:
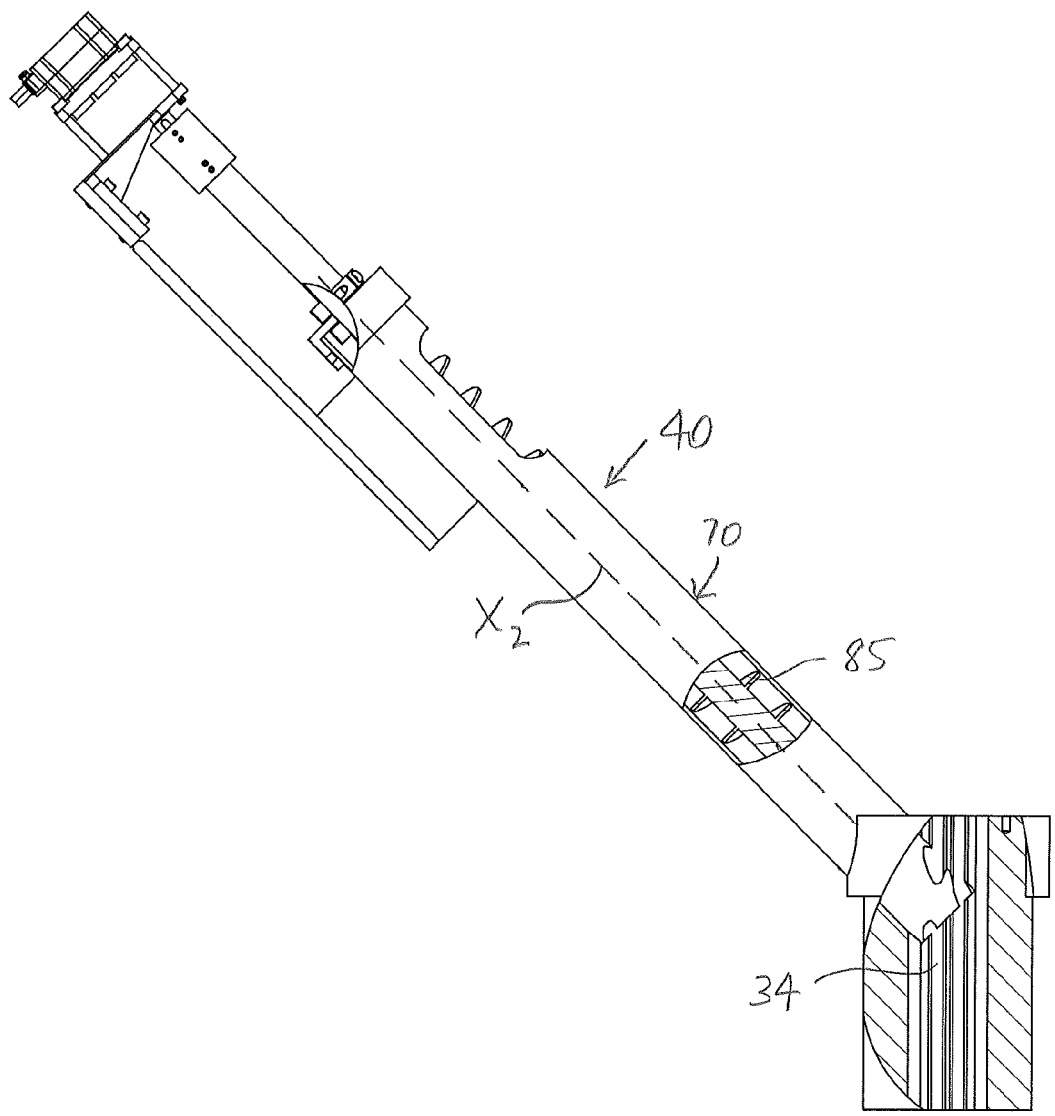
FIG. 5 is a side view of the fine meter assembly of FIG. 4A, with a housing thereof partially cut away.

In one embodiment, the system 20 preferably also includes a number of heat-generating elements 50 for heating the uncompressed mixture "M" and the first compressed mixture "$M_2$" to at least one preselected temperature that is less than a melting temperature of the binder component. For example, one of the heat-generating elements 50 that preferably are included in the mixer assembly 28 is illustrated in FIG. 2. The heat-generating element 50 that is included in the fine meter assembly 40 is illustrated in FIGS. 4A, 4B, and 5. One of the heat-generating elements 50 that are included in the first compression assembly is illustrated in FIG. 4B. It will be understood that the heat-generating elements may be any such elements that are suitable. Those skilled in the art would be aware of suitable heat-generating elements.

In one embodiment, the uncompressed mixture "M" preferably is pre-heated to a temperature that is only slightly less than the melting temperature "$T_m$" of the binder component 24. Where the binder component is a plastic that has a glass transition temperature "$T_g$" well above room temperature, the uncompressed mixture "M" preferably is heated to a temperature that is at least the glass transition temperature "$T_g$", but below the melting temperature "$T_m$". Those skilled in the art would appreciate that, in one embodiment, the uncompressed mixture "M" preferably is pre-heated while the binder component and the woody biomass component are mixed together in the mixer assembly 28.

Figure 6A:
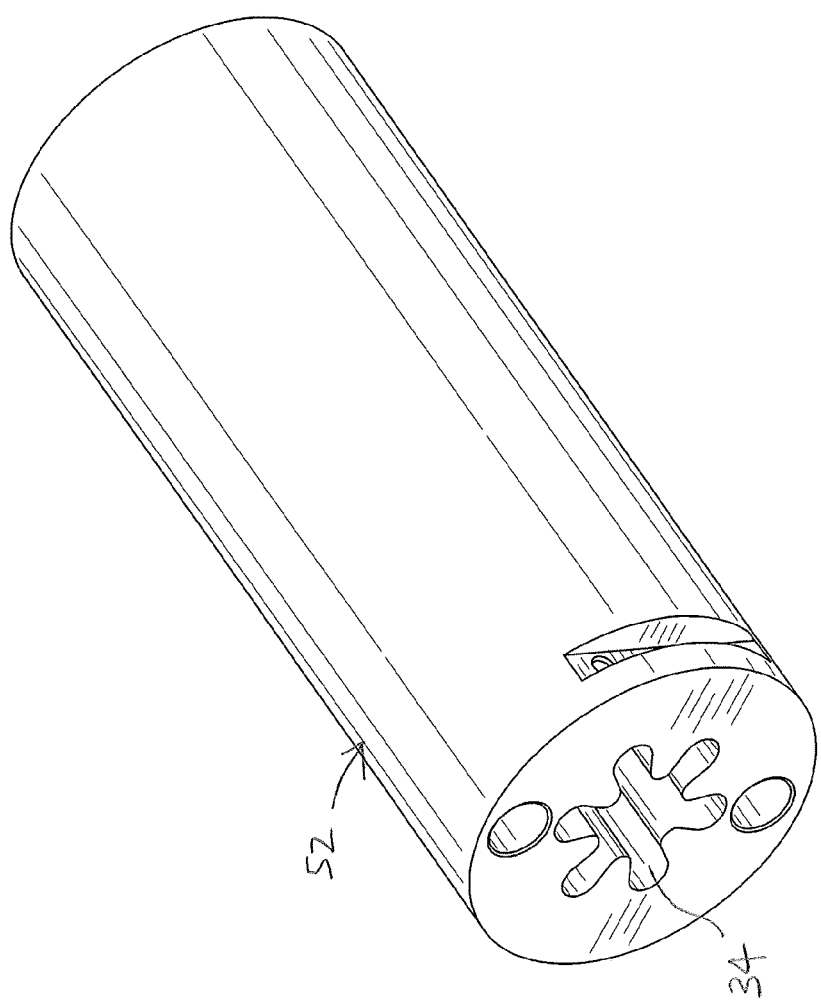
FIG. 6A is an isometric view of an embodiment of a first die of the first compression assembly, drawn at a larger scale.
Figure 6B:
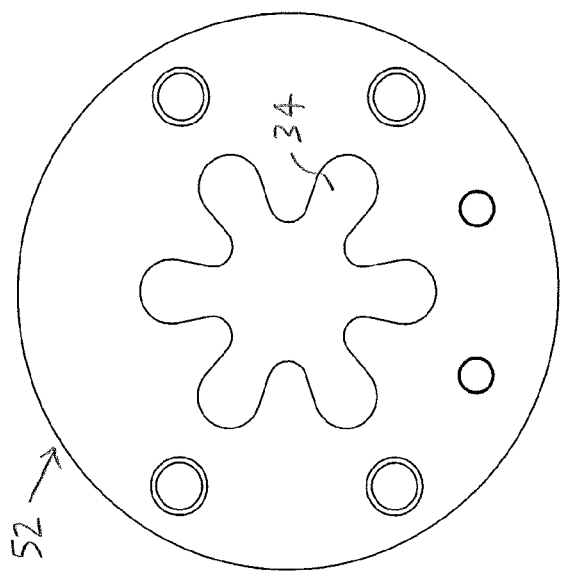
FIG. 6B is an end view of the first die of FIG. 6A.
Figure 6C:
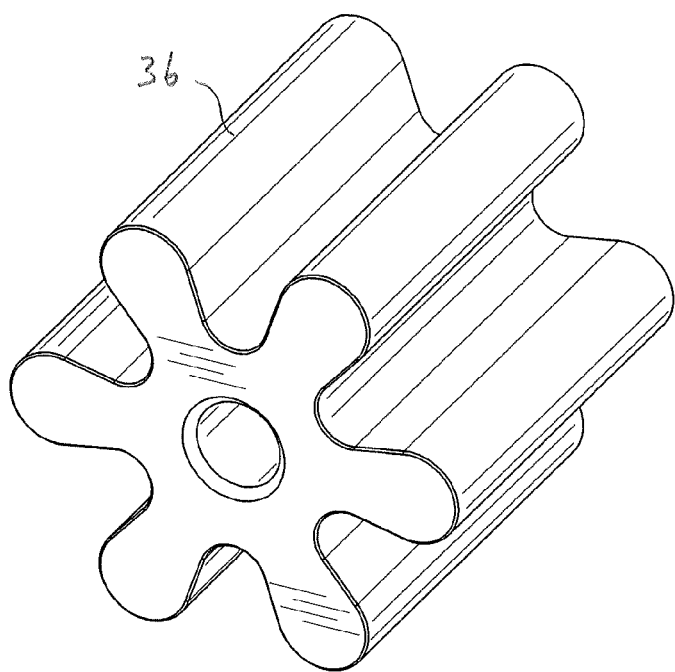
FIG. 6C is an isometric view of an embodiment of a first piston of the first compression assembly.

As will also be described, the first chamber 34 preferably is partially defined by a first die 52 (FIGS. 6A, 6B). It will be understood that the uncompressed mixture "M" preferably is maintained at substantially the same temperature (i.e., a temperature slightly below the melting temperature "$T_m$" of the binder component, but above the glass transition temperature "$T_g$" thereof) while the uncompressed mixture "M" is in the mixer cavity 58, while it is moved through the fine meter assembly 40, and while it is first positioned in the first chamber 34. Preferably, the first die 52 is heated, to maintain the temperature of the die 52 at a temperature that is slightly below the melting temperature "$T_m$" of the binder component. The heat may be transferred to the die 52 by conduction, from any suitable heat-generating element 50. The binder component in the uncompressed mixture "M" that is positioned in the first chamber 34 is therefore somewhat softened and pliable, i.e., when it is first positioned inside the first chamber 34. As the uncompressed mixture "M" is compressed in the first chamber 34, its temperature is also increased slightly due to the compression, so that the binder component melts during compression, at least in part. Under pressure, the at least partially melted binder component at least partially fills the interstices between the particles of the woody biomass component, to form the first compressed mixture "$M_2$" in the preliminary element 38.

In addition, it is preferred that the compression of the preliminary element 38 in the second chamber 46 to form the solid fuel element 26 is a substantially adiabatic process in which the final compressed mixture "$M_3$" is heated to a predetermined temperature that is at least equal to the melting temperature of the binder component. Such compression further squeezes the melted binder component 24 so that it flows into the interstices between the particles of the woody biomass component 24, and substantially fills the interstices between the particles of the woody biomass component.

Figure 1C:
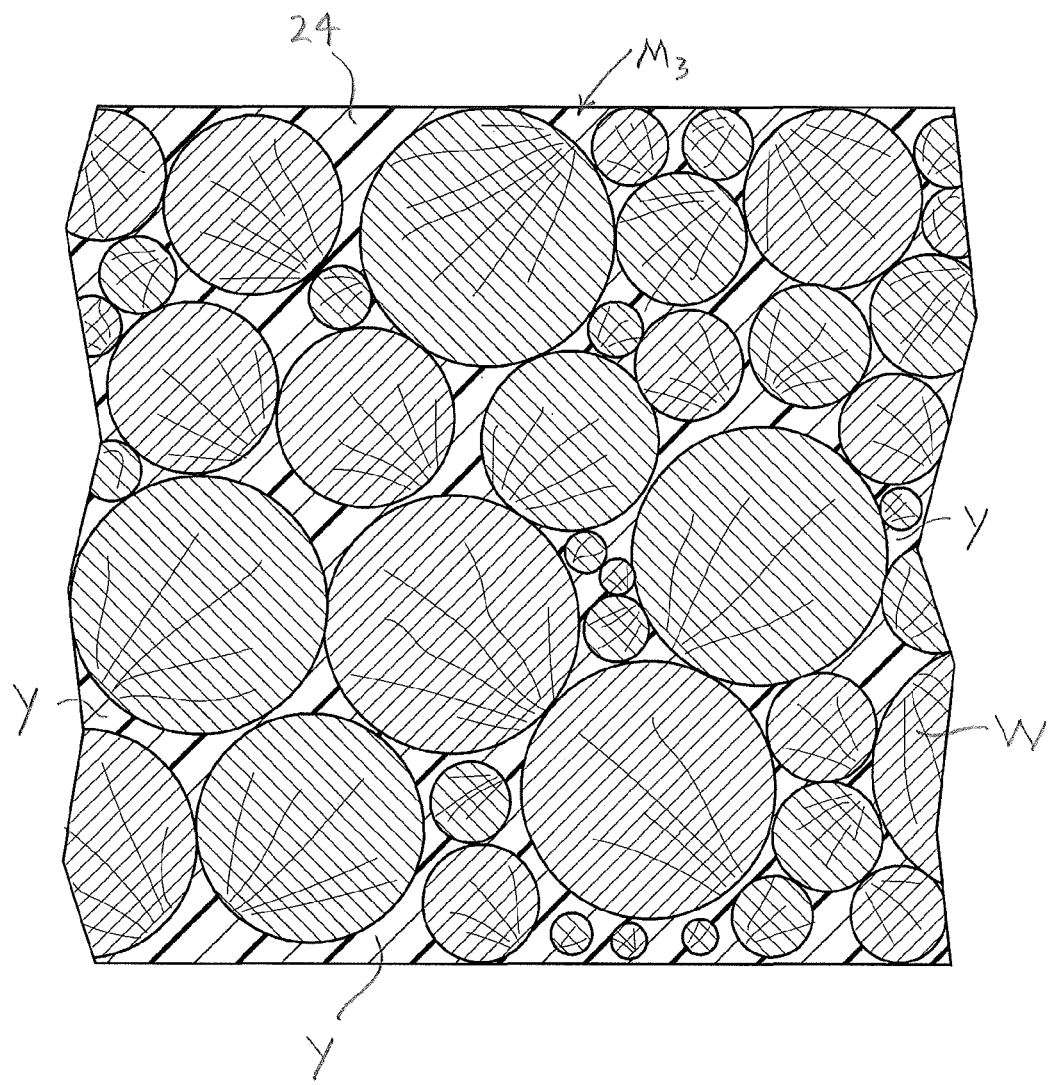
FIG. 1C is a schematic diagram showing the woody biomass component and the binder component in the solid fuel element of the invention, drawn at a larger scale.

FIG. 1C is a schematic representation of the final compressed mixture "$M_3$" in the solid fuel element 26, drawn at a large scale. As can be seen in FIG. 1C, particles "W" of the woody biomass component 22 define interstices "Y" therebetween, which are substantially filled with the melted binder component 24. It will be understood that the shapes and sizes of the particles of the woody biomass component 22 may vary substantially, and that the manner in which such particles are illustrated in FIG. 1C is only a schematic representation.

From the foregoing, it can be seen that, in the second chamber, the preliminary element 38 is formed into the solid fuel element 26 by compressing the preliminary element 38. As will be described, such compression results in a significant increase in density. In one embodiment, the solid fuel element 26 preferably has a density that is approximately double that of the preliminary element 38.

Those skilled in the art would appreciate that the mixer assembly 28 may be provided in any suitable form. As can be seen in FIG. 2, in one embodiment, the mixer assembly 28 preferably includes a mixer housing 54 extending between input and output ends 55, 56 thereof. Preferably, the mixer housing 54 defines a mixer cavity 58 therein, and also includes an input opening 60 at the input end 55 and an output opening 62 at the output end 56 that are in communication with the mixer cavity 58. It is also preferred that the mixer assembly 28 includes a mixer auger 64 at least partially located in the mixer cavity 58 and rotatable about a longitudinal axis "$X_1$" thereof, for mixing the woody biomass component 22 and the binder component 24 together in the mixer cavity 58 and moving the woody biomass component 22 and the binder component 24 from the input end 55 to the output end 56 as they are mixed together, to form the uncompressed mixture "M" at the output end 56.

As noted above, in one embodiment, the mixer assembly 28 preferably also includes one or more heat-generating elements 50 for heating the woody biomass component and the binder component as they are mixed together, and also for heating the uncompressed mixture "M". The heat-generating element may be any suitable heat-generating device. The temperature to which these are heated preferably is a temperature slightly below the melting temperature "$T_m$" of the binder component 24.

As indicated above, the uncompressed mixture "M" preferably is delivered to the fine meter assembly 40. Those skilled in the art would appreciate that the fine meter assembly 40 may be provided in any suitable form. In one embodiment, the fine meter assembly 40 preferably includes a hopper 68, in which the uncompressed mixture "M" is receivable (FIG. 2). The fine meter assembly 40 preferably also includes an auger subassembly 70, for drawing the uncompressed mixture "M" from the hopper 68 and delivering the predetermined amount(s) thereof to the first chamber 34 (FIG. 2).

Those skilled in the art would appreciate that the predetermined amount(s) of the uncompressed mixture "M" that is delivered to the first chamber 34 preferably is determined based on the a preselected size of the solid fuel element 26. As will be described, the solid fuel element 26 may be provided in a variety of sizes. It is preferred that the fine meter assembly 40 also includes a fine meter assembly controller 72 (FIG. 4A) which controls the auger subassembly 70 based on the second volume (or mass) of the solid fuel element 26 that is to be formed.

Those skilled in the art would also appreciate that the uncompressed mixture "M" may be provided to the hopper 68 of the fine meter assembly 40 from the mixer assembly 28 via any suitable delivery means. In one embodiment, the system 20 preferably also includes an intermediate feed control assembly 74 (FIGS. 1A, 1B, and 2). Preferably, the intermediate feed control assembly 74 includes a sensor 76 in the hopper 68, for sensing that the hopper 68 is vacated. Those skilled in the art would be aware of suitable sensors. It is also preferred that the intermediate feed control assembly 74 includes an intermediate feed control chamber 78 (FIG. 2) positioned below the output opening 62, to permit the uncompressed mixture "M" to fall into the intermediate feed control chamber 78 under the influence of gravity.

Preferably, the intermediate feed control assembly 74 also includes an upper gate 80 movable between a closed position (FIG. 2), in which the upper gate 80 prevents the uncompressed material "M" from falling from the output opening 62 into the intermediate feed control chamber 78, and an open position, in which the mixer cavity 58 is in fluid communication with the intermediate feed control chamber 78. It is also preferred that the intermediate feed control assembly 74 includes a lower gate 82 movable between a closed position (FIG. 2), in which the lower gate 82 partially defines the intermediate feed control chamber 78, and an open position, in which the uncompressed mixture "M" located in the intermediate feed control chamber 78 is permitted to exit therefrom to the hopper 68 under the influence of gravity.

It will be understood that the gates 80, 82 are shown in their respective open positions in dashed outlines. It will also be understood that the gates 80, 82 are moved between their respective open and closed positions by suitable mechanisms (e.g., hydraulic cylinders) that are omitted from FIG. 2 for clarity of illustration.

The intermediate feed control assembly 20 preferably also includes a controller 84 (FIG. 2) for controlling movement of the upper and lower gates 80, 82. Preferably, the controller 84 is configured for moving the upper gate 80 to the open position thereof and for moving the lower gate 82 to the closed position thereof upon receiving a signal from the sensor 76 indicating that the hopper 68 is empty. The controller 84 preferably is further configured to close the upper gate 80 and to open the lower gate 82 when a predetermined intermediate amount of the uncompressed mixture "M" is in the intermediate feed control chamber 78, the predetermined intermediate amount preferably being receivable in the hopper 68. Those skilled in the art would appreciate that such control of the movement of the gates 80, 82 is effected by the controller 84 via control of the means for moving the gates 80, 82, e.g., respective hydraulic cylinders, which are omitted from FIG. 2 for clarity of illustration.

For clarity of illustration, the upper gate in its open position is illustrated in FIG. 2 in dashed lines. In its open position, the upper gate is identified by reference character 80', for clarity of illustration. The movement of the upper gate between its open and closed positions is indicated by the double-headed arrow "UG" in FIG. 2.

For clarity of illustration, the lower gate in its open position is illustrated in FIG. 2 in dashed lines. In its open position, the lower gate is identified by reference character 82', for clarity of illustration. The movement of the lower gate between its open and closed positions is indicated by the double-headed arrow "LG" in FIG. 2.

In one embodiment, the mixer auger 64 preferably continues to rotate about its longitudinal axis "$X_1$" when the upper gate 80 is open. The mixer auger 64 pushes the uncompressed mixture "M" to the output opening 62, as indicated by arrow "C" in FIG. 2. If the upper gate 80 is in its open position, the uncompressed mixture "M" at the output end 56, pushed to the output opening 62 by the auger 64, falls through the output opening 62 into the intermediate feed control chamber 78, as indicated by arrows "D" and "E" in FIG. 2. Accordingly, the upper gate 80 preferably is closed after the mixer auger 64 has rotated a sufficient number of times to provide enough uncompressed mixture "M" to substantially fill the intermediate feed control chamber 78.

Those skilled in the art would appreciate that the flow of material into the intermediate feed control chamber 78 may be controlled based on various other parameters. For example, the amount of the uncompressed mixture "M" in the intermediate feed control chamber 78 may be weighed as it is positioned therein, and the upper gate may be configured to close once a certain weight of the uncompressed mixture "M" is in the intermediate feed control chamber 78.

It will be understood that the controller 84 is configured to receive a signal from the sensor 76, indicating that the hopper 68 is empty, or at least substantially empty. In one embodiment, upon receiving such signal, the controller 84 causes the lower gate 82 to move to its closed position, and causes the upper gate 80 to move to its open position. When the intermediate feed control chamber 78 is filled (or substantially filled) with the uncompressed mixture "M", the upper gate 80 is moved to its closed position, due to appropriate signals from the controller 84.

In accordance with signals from the controller 84, the lower gate 82 is opened to permit the amount of the uncompressed mixture "M" that is in the intermediate feed control chamber 78 to fall into the hopper 68, i.e., under the influence of gravity, as indicated by arrow "F" in FIG. 2. The auger subassembly 70 includes a fine meter auger 85 that is rotatable about its longitudinal axis "$X_2$" (FIG. 5). The uncompressed mixture "M" is then drawn from the hopper 68 when the auger 85 is rotated, and the rotating auger 85 carries the uncompressed mixture "M" to the first chamber 34, as indicated by arrow "G" in FIG. 2.

Those skilled in the art would appreciate that the fine meter auger 85 may be rotated by any suitable drive means "DM" (FIG. 4A). For example, the drive means "DM" may include a suitable electric motor. It will be understood that the drive means "DM" is controlled by the controller 72.

As will be described, it is preferred that the woody biomass component 22 and the binder component 24 have a predetermined woody biomass particle distribution and a predetermined binder particle distribution respectively. Those skilled in the art would appreciate that the woody biomass component 22 and the binder component 24 may be provided having the predetermined respective particle size distributions. Alternatively, as can be seen in FIG. 1B, the system 20 preferably includes a woody biomass processor 86, for forming the woody biomass component 22 into a number of woody biomass particles "W" (FIG. 1C) of woody biomass having the predetermined woody biomass particle size distribution, and a binder processor 88, for forming the binder component into particles (not shown) of the binder component having the predetermined binder particle size distribution.

As described above, and as schematically illustrated in FIG. 1B, the woody biomass component 22 having the predetermined woody biomass particle size distribution and the binder component 24 having the predetermined binder particle size distribution preferably are delivered into the mixer cavity 58 in the predetermined proportions. Those skilled in the art would appreciate that the measurement and control of the woody biomass component and the binder component as they are fed into the mixture cavity 58 in the predetermined proportions may be accomplished using any suitable means. The measuring means used to accomplish this are represented in FIG. 1B by a measuring device identified therein by reference numeral 89.

In an alternative embodiment, the system preferably includes the first compression assembly, for compressing the uncompressed mixture into the preliminary element, having the preliminary density. The system also includes the second compression assembly, for compressing the preliminary element to form the solid fuel element 26 therefrom. As noted above, the solid fuel element has the predetermined density, which is greater than the preliminary density.

INDUSTRIAL APPLICABILITY

One embodiment of a method of the invention includes providing the woody biomass component, the woody biomass component 22 including the woody biomass particles "W" having the predetermined woody biomass particle size distribution, and also providing the binder component 24, the binder component including the binder particles having the predetermined binder particle size distribution. The woody biomass component 22 and the binder component 24 preferably are mixed together in predetermined proportions relative to each other to provide the uncompressed mixture "M". The first compression assembly 30 is provided, which assembly includes the first cylinder 32 having the first chamber 34 therein and the first piston 36 movable in the first cylinder 34. Via the fine metering assembly 40, one or more predetermined amounts of the uncompressed mixture "M" is delivered to the first chamber 34. With the first compression assembly 30, the predetermined amount(s) of the uncompressed mixture "M" is compressed, to provide the preliminary element 38. As described above, the preliminary element 38 includes a first compressed mixture "$M_2$" having the preliminary density. The second compression assembly 42 is also provided. The second compression assembly 42 preferably includes the second cylinder 44, which includes the second chamber 46 therein and the second piston 48 movable in the second cylinder 44. The preliminary element 38 is positioned in the second chamber 46, and the preliminary element 38 is compressed in the second chamber 46 to form the solid fuel element 26. As noted above, the solid fuel element 26 has the predetermined density, which is greater than the preliminary density. Finally, the solid fuel element 26 is removed from the second chamber 46, as will be described.

It is preferred that the increase in density, from the preliminary density to the predetermined density, is substantial. For example, it has been determined that, in one embodiment, the preliminary density may be between approximately 0.4 g/cc and approximately 0.5 g/cc, and the predetermined density preferably is approximately 1.0 g/cc.

It is preferred that the predetermined proportions of the woody biomass component 22 and the binder component 24 are as follows:

at least about 70% and at most about 80% by weight of the woody biomass component 22; and at least about 20% and at most about 30% by weight of the binder component 24.

It has been found that, when the binder component is at about 20% to about 25% by weight of the solid fuel element 26 (i.e., and the woody biomass component is about 75% to about 80% by weight), the best results are achieved. The fuel element of the invention is virtually odorless and smokeless, and is non-toxic.

The predetermined proportions are preferred because, with these proportions, the energy content (releasable upon combustion of the solid fuel element 26) is between approximately 24,400 kilojoule per kilogram (approximately 10,500 BTU per pound) and approximately 26,750 kilojoule per kilogram (approximately 11,500 BTU per pound). It is believed that the energy content of the solid fuel element 26 should be as set out above in order for the solid fuel element to be competitive with other fuels.

In one embodiment, the uncompressed mixture "M" preferably has a predetermined moisture content. For example, it is preferred that the moisture content is approximately 10% by weight of the uncompressed mixture "M". However, it appears that moisture content, although important, may vary to over 10% by weight.

As noted above, it is preferred that the thermal stability of the uncompressed mixture "M" and the first compressed mixture "$M_2$" and the final compressed mixture "$M_3$" be maintained throughout. The temperature of the uncompressed mixture "M" preferably is maintained at a temperature that is slightly below the melting temperature "$T_m$" of the binder component 24, i.e., where the binder component is a plastic that is hard or brittle at room temperature, the temperature of the uncompressed mixture "M" should be maintained at a temperature at or above the glass transition temperature "$T_g$", but below the melting temperature "$T_m$".

For instance, in one embodiment, when the woody biomass component 22 and the binder component 24 are mixed together to form the uncompressed mixture "M", they and the uncompressed mixture "M" preferably are heated to a preselected temperature that is below a melting temperature "$T_m$" of the binder component 24. As noted above, such temperature preferably is at or above the glass transition temperature "$T_g$" for the binder component. As will be described, the heat may be provided by any suitable heat-generating means.

Similarly, when the uncompressed mixture "M" is delivered to the first chamber 34 by the fine meter assembly 40, the uncompressed mixture "M" preferably is heated to the preselected temperature, i.e., a temperature that is below the melting temperature "$T_m$" of the binder component 24. Such temperature preferably is at or above the glass transition temperature "$T_g$" for the binder component. The heat may be provided by any suitable heat-generating means.

It is also preferred that, when the uncompressed mixture "M" is delivered to the first chamber 34 in the first compression assembly 30, the uncompressed mixture "M" is maintained at the preselected temperature, i.e., at a temperature that is below the melting temperature "$T_m$" of the binder component 24. Such temperature preferably is at or above the glass transition temperature "$T_g$" for the binder component. As described above, the heat may be provided by any suitable heat-generating means.

Because the preselected temperature preferably is at or above the glass transition temperature "$T_g$" and below the melting temperature "$T_m$", the binder component 24 is relatively pliable during the processes described above. In particular, when the uncompressed mixture "M" is compressed in the first chamber 46, the binder component 24 is only partly pushed into the interstices "Y" at that point. As noted above, it is believed that during compression in the first chamber, additional heat energy due to such compression heats the binder further, causing it to be more pliable at that point. However, it is believed that the first compression is not sufficient to press the binder fully into all the interstices between the woody biomass particles.

It is also believed that the compression of the preliminary element 38 in the second chamber 46 is a substantially adiabatic process in which, during the compression of the preliminary element 38, the preliminary element 38 is heated to the predetermined temperature, which is at least equal to the melting temperature "$T_m$" of the binder component. The increase in the temperature of the material that is compressed in the second compression assembly is believed to be due to such compression. Because the predetermined temperature is equal to or greater than the melting temperature "$T_m$," of the binder component, the binder component 24 is flowable, and can be caused (by the compression of the first compressed mixture "$M_2$" in the second compression assembly 42) to flow into the interstices "Y", and to substantially fill the interstices "Y", to form the second compressed mixture "$M_3$" (FIG. 1C). It is believed that, in order for the solid fuel element 26 to have the predetermined density, the interstices "Y" are substantially filled with the binder component 24.

In one embodiment, the uncompressed mixture "M" that is positioned in the first chamber 34 is subjected to a first compression force of approximately 3.15 tonne per square meter (2 long tons per square inch) for a first compression period. Those skilled in the art would appreciate that the first compression period is that time of compression of the uncompressed mixture "M" by the first compression force that is needed to achieve the preliminary density of the preliminary element 38, and may be determined accordingly.

As will be described, the solid fuel element 26 may have any suitable mass, and occupy any suitable volume, as required. The first compression period may vary based on the size of the solid fuel element 26 to be produced. In one embodiment, it is preferred that the predetermined amount(s) of the uncompressed material "M" is delivered to the first chamber 34 in three separately delivered portions, and each said portion is compressed in the first chamber consecutively, to form the preliminary element 36. It has been found that this is an efficient way to provide the preliminary element 36 when the solid fuel element 26 has a weight of approximately 150-160 grams. Those skilled in the art would appreciate that a given mass of the uncompressed mixture "M" may occupy a relatively large volume before it is compressed to form the first compressed mixture "$M_2$". Accordingly, introducing only a relatively small amount of the uncompressed mixture "M" takes up a relatively smaller volume in the first chamber, prior to the first compression. To provide a sufficient mass of the uncompressed mixture "M" for a solid fuel element having a particular mass, therefore, it may be preferably, as a practical matter, to deliver the uncompressed mixture "M" to the first chamber in instalments, with each such instalment being compressed before a subsequent instalment is delivered.

From the foregoing, it can be seen that control of the amount of the uncompressed mixture "M" may be controlled via the fine meter assembly 40. For example, in one embodiment, the weight of the solid fuel element 26 that is to be formed preferably is provided to the controller 72, which then causes the auger 85 to rotate the number of rotations necessary for delivery of the appropriate amount of the uncompressed mixture "M" to the first chamber 34.

As noted above, depending on the desired mass of the solid fuel element to be formed, the uncompressed mixture for the solid fuel element may be delivered in instalments to the first compression assembly, each instalment being compressed before the next instalment is delivered to the first chamber. It is preferred that the delivery of the uncompressed mixture "M" in instalments is controlled by the controller 72.

It is also preferred that, in the second chamber 46, the preliminary element 38 is subjected to a second compression force of approximately 4.275 tonne per square meter (3 long tons per square inch) for a second compression period in order to provide the solid fuel element 26.

As can be seen in FIGS. 6A and 6B, the first chamber 34 is at least partially defined by the first die 52. The first compression assembly 30 preferably also includes a first end plate 90 that, when in a closed position thereof (FIGS. 1A, 3A), also partially defines the first chamber 34. It will be understood that the first die 52 is shaped to form the pre-heated mixture "M" into the preliminary element 38. Those skilled in the art would appreciate that the dimensions and shape of the first die 52 preferably are ultimately based on the preferred dimensions and shape of the solid fuel element 26. Those skilled in the art would also appreciate that the first piston 36 (FIGS. 2, 6C, 6D) is shaped and sized to fit within the first die 52, to form the preliminary element 38. It will be understood that the first die 52 fits in the first cylinder 32, and the uncompressed mixture "M" is delivered into the first chamber 34 at the bottom of the first cylinder 32, when the first piston 36 is in a raised position (FIG. 2). At this point, the first end plate 90 is in its closed position, and the first end plate 90 supports the predetermined amount of the uncompressed mixture "M" thereon. It will also be understood that, after the predetermined amount of the uncompressed mixture is in the first chamber 34, the first piston 36 is driven by a hydraulic ram or other suitable driving means to exert the necessary pressure to form the uncompressed mixture "M" in the first chamber 34 into the preliminary element 38. The direction in which the first piston 52 is driven into the uncompressed mixture "M" is indicated by arrow "H" in FIG. 3A.

It will also be understood that the pre-heated mixture "M" is not shown in an uncompressed state in the first chamber 34 to simplify the illustrations.

In one embodiment, once the uncompressed mixture "M" has been formed into the preliminary element 38, the first end plate 90 is moved to its open position (FIG. 3A), and the preliminary element 38 exits the first die 52 downwardly, under the influence of gravity. The movement of the first end plate 90 to its open position is indicated by arrow "I" in FIG. 3A. The first end plate is shown in its open position in dashed outline in FIG. 3A. For clarity of illustration, the first end plate in its open position is identified by reference character 90' in FIG. 3A.

As can be seen in FIG. 3A, when the first end plate 90 is moved to its open position, the preliminary element 38 falls into the second chamber 46, in the second cylinder 44, under the influence of gravity. The movement of the preliminary element 38 into the second cylinder 44 is indicated by arrow "J" in FIG. 3A.

Figure 3B:
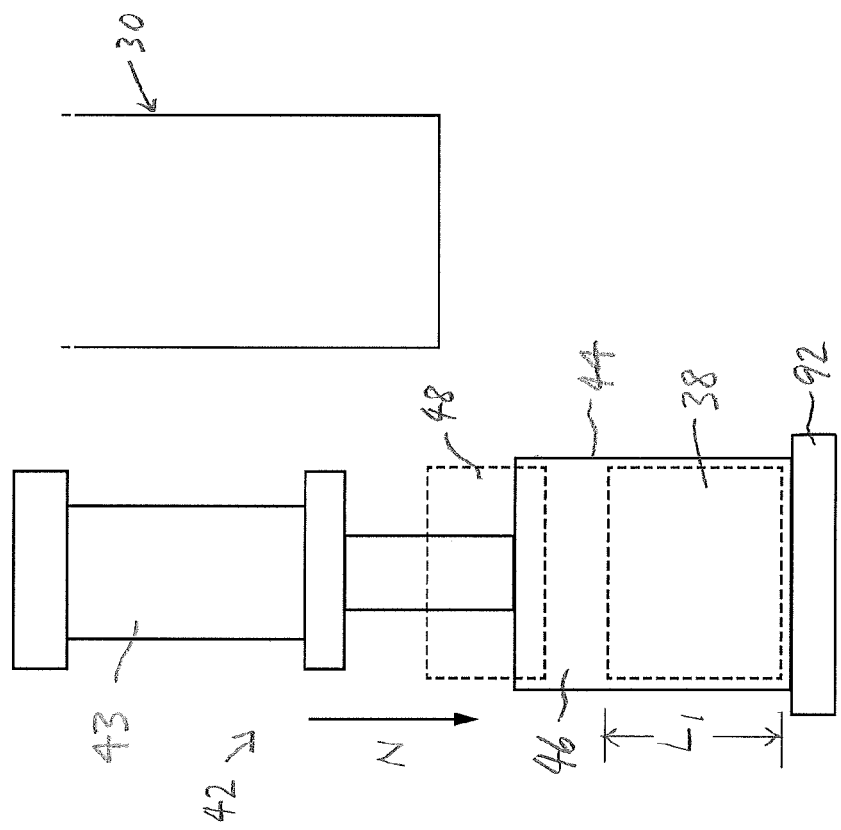
FIG. 3B is a side view of the first and second compression assemblies of FIG. 3A in which the second cylinder of the second compression assembly is in a second position thereof.
Figure 3C:
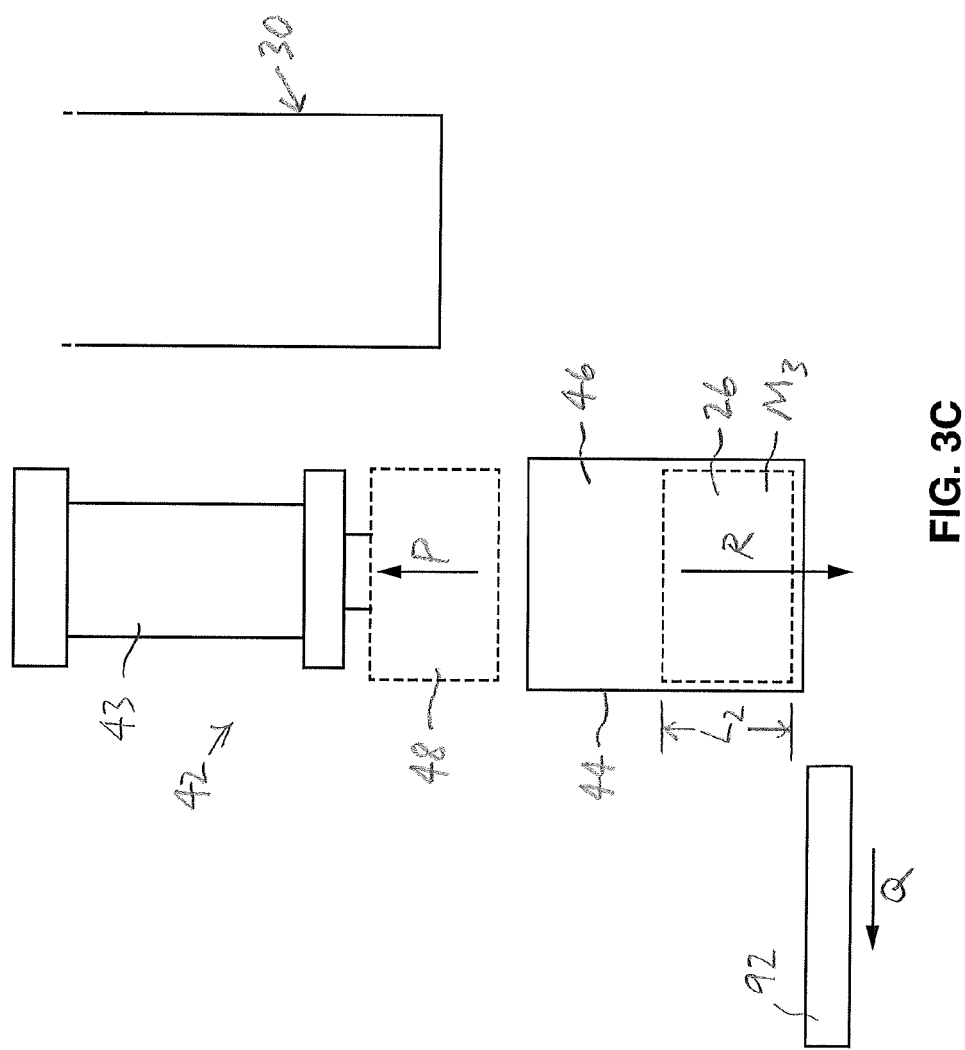
FIG. 3C is a side view of the first and second compression assemblies of FIGS. 3A and 3B in which the second chamber is in the second position thereof and a second filling plate thereof is removed, to permit the solid fuel element to exit from the second chamber.

In one embodiment, once the preliminary element 38 is positioned therein, the second cylinder 44 preferably is moved laterally, so that it is aligned with the second piston 48. The movement of the second cylinder 44 to its position in which it is aligned with the second piston 48 is indicated by arrow "K" in FIG. 3A. As illustrated in FIGS. 3A and 3B, such movement is lateral, however, it will be understood that such movement may be any suitably directed movement to transport the second cylinder 44 to a location where it is vertically aligned with the second piston 48.

As can be seen in FIG. 3B, when the second cylinder 44 is aligned with the second piston 48, the second piston 48 is rammed downwardly onto the preliminary element 38, to form the preliminary element 38 into the solid fuel element 26. Preferably, the second piston 48 is driven by a suitable hydraulic cylinder, or by any other suitable means. The direction of movement of the second piston 48 to compress the preliminary element 38, i.e., to form the solid fuel element 26, is indicated by arrow "N" in FIG. 3B.

It will be understood that the second chamber 46 is partially defined by a suitably formed cavity (not shown) in a second die (not shown) that is positioned in the second cylinder 44. It will also be understood that the second piston is shaped to fit within the second die, to form the solid fuel element 26 when the preliminary element 38 is subjected to compression in the second chamber 46. Those skilled in the art would appreciate that the second piston 48 is substantially the same as the first piston 36. It would also be appreciated that the second die is substantially the same as the first die, except that the cavity defined in the second die is substantially shorter than the corresponding cavity in the first die. As will be described, in the second chamber 46, the compression is effected by reducing a length of the preliminary element to form the solid fuel element.

As can be seen in FIGS. 3A and 3B, the second chamber 46 is partially defined by a second end plate 92. The second end plate 92 is movable between a closed position (illustrated in FIGS. 3A and 3B) and an open position (illustrated in FIG. 3C).

As noted above, the preliminary element 38 is subjected to the second compression force in the second compression assembly 42 for the second compression period, to form the preliminary element 38 into the solid fuel element 26. Those skilled in the art would appreciate that the second compression period is that time of compression of the preliminary element by the second compression force that is needed to achieve the predetermined density of the solid fuel element 26, and may be determined accordingly. At the end of the second compression period, the second piston 48 is retracted (as indicated by arrow "P" in FIG. 3C), and the second end plate 92 moves to its open position, as indicated by arrow "Q" in FIG. 3C. Under the influence of gravity, the solid fuel element 26 then falls out of the second cylinder 44, as indicated by arrow "R" in FIG. 3C.

The preliminary element 38 has a length "$L_1$" when it is formed in the first compression assembly 30. However, the solid fuel element 26 that is formed from the preliminary element 38 has a length "$L_2$" that is less than the length "$L_1$". For example, the length "$L_1$" of the preliminary element 38 may be approximately 15.24 cm (approximately 6 inches), and the length "$L_2$" of the solid fuel element 26 resulting from the compression thereof may be approximately 7.62 cm (approximately 3 inches).

As noted above, the binder component 22 may be any suitable material. For example, non-hazardous polyethylene (PE) is a suitable binder material. The PE has been found to be advantageous in different ways. First, the use of the PE enhances the lubricity of the mixture as it is processed. Second, due to the presence of the PE in the mixture, the mixture is substantially non-hygroscopic. Also, the mechanical strength of the mixture is significantly enhanced due to the use of PE, as the PE also serves as a binder, binding the woody biomass pieces in the solid fuel element 26.

The solid fuel element 26 is non-hygroscopic. The non-hygroscopic nature of the solid fuel element 26 is advantageous when compared, for example, to the prior art wood fuel pellets. The conventional wood pellets are generally hygroscopic unless they have been subjected to torrefaction. In contrast to this, however, the solid fuel element 26 is non-hygroscopic, in the absence of torrefaction. This represents a significant cost advantage of the fuel element of the invention over conventional alternate fuels fuel pellets.

As noted above, the woody biomass component and the binder component preferably are waste by-products, and the woody biomass component and the binder component may be provided having suitable particle size distributions. Those skilled in the art will also be aware of suitable equipment which may be used to shred the woody biomass and the binder material, if necessary. The shredding preferably is done so as to achieve appropriate the predetermined woody biomass particle size distribution and the predetermined binder particle size distribution for the woody biomass component 22 and the binder component 24 respectively. For instance, it has been found that when the woody biomass component is shredded into pieces or particles that are less than about 0.635 cm (about 0.25 inches) in diameter, the mixture that includes such woody biomass pieces or particles performs adequately.

In practice, the binder component 24 may be provided in the form of pellets, strips and/or shreds, and the thickness or diameter of such pellets, strips and shreds may be up to about 0.3048 mm (about 12 mil (0.012 inches)).

It will be understood that other particle size distributions of the woody biomass component and/or the binder component may be suitable.

As described above, the shredded woody biomass and the shredded binder material preferably are mixed together in the predetermined proportions in the mixer assembly 28, to form the uncompressed mixture "M". Preferably, after mixing, the woody biomass component 22 and the binder component 24 are substantially consistently distributed throughout the uncompressed mixture "M". Those skilled in the art will be aware of suitable mixers.

Controlling moisture content in the mixture has been found to be not as important as it is, for instance, in manufacturing wood pellets. This has the important benefit that there is no requirement to closely monitor and control moisture content in the process of manufacturing the fuel element of the invention. Also, because the solid fuel element 26 is non-hygroscopic and relatively robust, the solid fuel element 26 does not require special handling.

In tests, the solid fuel element 26 has been found to have a density between approximately 1.035 g/cc and approximately 1.065 g/cc. Those skilled in the art would appreciate that the solid fuel element may have any suitable size. It is believed that a slightly larger solid fuel element may be more economic for industrial and commercial applications. For example, in one embodiment, the solid fuel element 26 may be about 7.62 cm (about 3 inches) in length. This embodiment of the fuel element preferably weighs between approximately 150 g and approximately 160 g, e.g., approximately 156 g. The solid fuel element 26 is a relatively long-burning fuel, able to support combustion thereof over a relatively long period of time.

In an alternative embodiment of the method of the invention, the method includes, with the first compression assembly, compressing the uncompressed mixture to form the preliminary element, having the preliminary density. The method also includes further compressing the preliminary element, in the second compression assembly, to form the solid fuel element 26. The solid fuel element has the predetermined density, which is greater than the preliminary density. The solid fuel element is subsequently removed from the second compression assembly.

In use, the solid fuel element 26 has been found to have a number of advantages over the prior art. Due to the optimized densification, gaps in the surface of the element 26 are minimized. As noted above, the solid fuel element 26 is non-hygroscopic. Also, it has been found that the ash resulting from combustion of the solid fuel element 26 is benign. That is, the ash resulting from the combustion of the fuel element is relatively benign as compared to, for example, conventional bottom ash. The ash from combustion of the fuel element is relatively benign where, for example, the fuel element consists of cellulose (i.e., from the woody biomass component) and non-hazardous polyethylene.

Figure 9A:
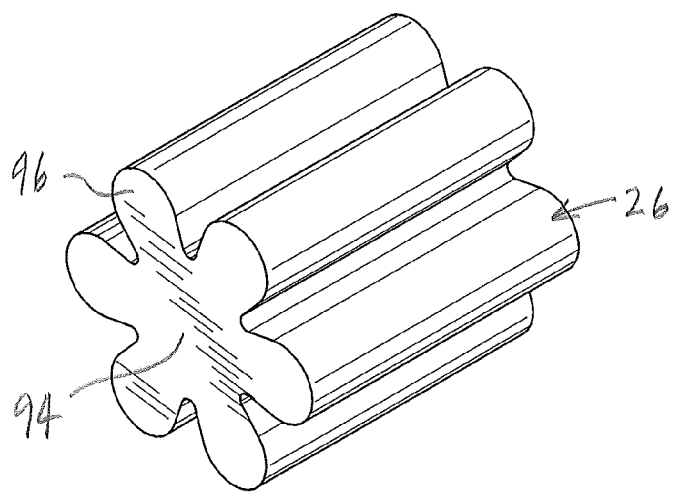
FIG. 9A is an isometric view of an embodiment of a solid fuel element of the invention, drawn at a smaller scale.
Figure 9C:
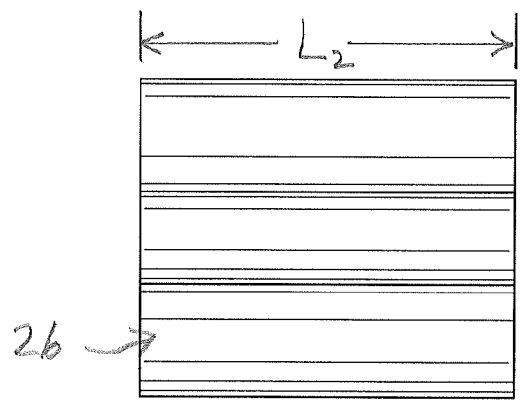
FIG. 9C is a side view of the solid fuel element of FIGS. 9A and 9B, drawn at a larger scale.
Figure 9B:
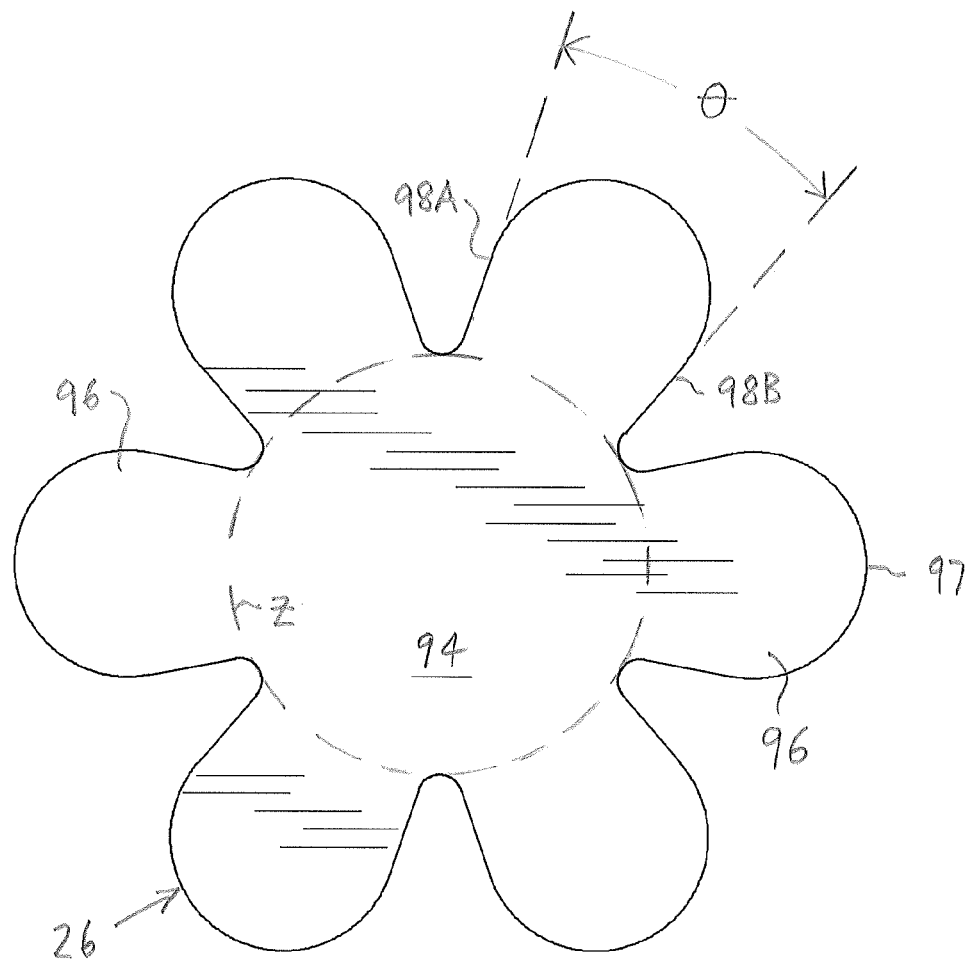
FIG. 9B is an end view of the solid fuel element of FIG. 9A.

The solid fuel element 26 may have any suitable configuration. As can be seen in FIGS. 9A-9C, in the predetermined configuration of the solid fuel element 26, it is preferred that the solid fuel element 26 includes a core portion 94 and a number of lobes 96 extending radially from the core portion 94. In one embodiment, and as can be seen in FIG. 9B, it is preferred that the core portion 94 is substantially cylindrical. In FIG. 9B, a dashed outline "Z" represents the outer edge of the core portion 94. Due to its configuration, the solid fuel element 26 has a consistent heat signature during combustion.

Because the lobes 96 extend radially from the core portion 94, a relatively large surface area of the solid fuel element 26 is exposed prior to combustion, for initiating combustion. In addition, due to the geometry of the embodiment of the solid fuel element 26 as illustrated in FIGS. 9A-9C, air circulation in and around the lobes 96 and the core portion 94 is promoted, resulting in a more efficient burn, as compared to alternate fuel materials generally. Also, the solid fuel element 26 is designed so that self-ablation of the solid fuel element 26 (i.e., due to ash falling off the non-combusted portion during combustion) will generally result in the exposure of more surface area of the remaining (noncombusted) portion of the solid fuel element 26. As a result, the solid fuel element 26 has a relatively consistent heat signature during combustion. As compared to most alternate fuels fuel pellets, the configuration of the solid fuel element 26 results in a more consistent, efficient and sustainable burn without the need for high flue velocity venting.

In one embodiment, for example, the core portion 94 is substantially cylindrical and the solid fuel element 26 preferably includes six of the lobes 96 spaced radially equidistantly (or substantially equidistantly) around the core portion 94, i.e., each lobe 96 is radially distanced 60° from those adjacent to it. Preferably, and as can be seen in FIGS. 9A-9C, each lobe 96 includes a rounded outer end 97 and substantially planar sides 98A, 98B that define an angle θ of approximately 22°, opening toward the outer end 97. It will be understood that the solid fuel element 26 may include any suitable number of the lobes 96.

It is believed that replacing a conventional fuel (e.g., coal) with the solid fuel element 26 results in a substantial reduction in toxic gases produced. In addition, the solid fuel element 26, when burned with coal, appears to burn a substantial portion of the toxic gases produced by combustion of the coal. The solid fuel element 26 burns significantly hotter than the coal. It is believed that, as a result, burning the solid fuel element 26 with coal may result in a reduction in the requirement of the scrubbers for the toxic gases.

In summary, the solid fuel element 26 provides a number of benefits, some of which are as follows.

The solid fuel element 26 is virtually smokeless, virtually odorless, and non-toxic, and there are no residuals after combustion.

The solid fuel element 26 is capable of sustaining its combustion.

The solid fuel element 26 provides substantially constant heat during its combustion.

The solid fuel element 26 may have an energy content of greater than about 25,500 kilojoule per kilogram (about 11,000 BTU per pound), which is a specific energy greater than those of bituminous coal and wood pellets.

No external airstream is required to sustain combustion of the solid fuel element 26.

Torrefaction is not required for desirable hygroscopic characteristics.

The solid fuel element 26 is not susceptible to storage and transport damage in hot and humid environments.

The solid fuel element 26 is water-resistant.

The use of the method described above to create the solid fuel element 26 ultimately can result in significant labor and operating cost savings, environmental benefits, reduced transport costs and reduced pollution, as well as diverting significant portions of waste stream away from landfill sites. Because the fuel element is non-hygroscopic, the material may be stored outside, so that no special storage devices or buildings are required.

Figure 7:
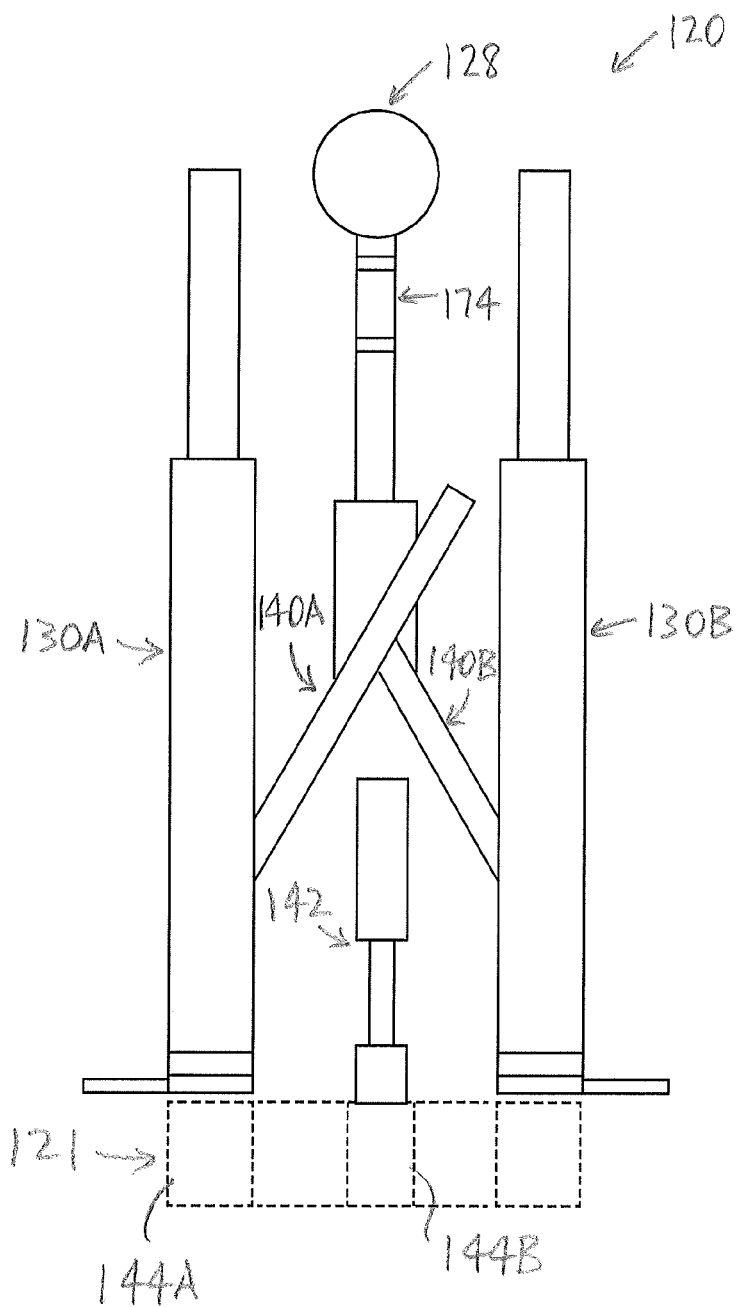
FIG. 7 is a schematic diagram of an alternative embodiment of the system of the invention.

Those skilled in the art would appreciate that the system of the invention may be provided in different configurations, for improved productivity. In one embodiment, a system 120 of the invention, as schematically illustrated in FIG. 7, preferably includes two first compression assemblies 130A, 130B and two fine metering assemblies 140A, 140B, which provide the uncompressed mixture "M" to the compression assemblies 130A, 130B respectively. The system includes the mixer assembly 128, and may include one or more intermediate feed control assemblies 174, for controlling the flow of the uncompressed mixture "M" to the fine meter assemblies 140A, 140B.

It is preferred that the system 120 includes a shuttle assembly 121 (FIG. 7). As will be described, the shuttle assembly 121 is configured for movement of second cylinders 144A, 144B between first and second positions thereof. When the second cylinder 144A is in its first position, it is aligned with the first compression assembly 130A, i.e., ready to receive the preliminary element 38 (not shown in FIG. 7) therein. When the second cylinder 144A is in its second position, the second cylinder 144A is aligned with the second piston 148. In its second position, the second cylinder 144A includes the preliminary element 38 therein, for compression therein to form the solid fuel element 26 (not shown in FIG. 7).

For clarity of illustration, the second cylinder 144A is shown in its first position in FIG. 7, and the second cylinder 144B is shown in its second position. It will be understood that, once the solid fuel element formed in the second cylinder 144B has exited therefrom, the second cylinder 144B moves to its first position, i.e., aligned with the first compression assembly 130B.

It will also be understood that, once the preliminary element has dropped into the second cylinder 144A, the second cylinder 144A will move to its second position, in which it is aligned with the second piston 148. Preferably, the lateral movements of the second cylinders 144A, 144B are timed so that they take place substantially contemporaneously.

Those skilled in the art would appreciate that, in order to achieve the foregoing coordinated movements of the second cylinders 144A, 144B between their respective first and second positions, the first compression assemblies 130A, 130B preferably are operated asynchronously, in order to provide a relatively high rate of production. For example, when the preliminary element 38 exits from the first compression assembly 130A, the other first compression assembly 130B has completed its cycle, and is receiving new uncompressed mixture "M" in its first chamber, or such uncompressed mixture is being compressed in the first compression assembly 130B.

Figure 8A:
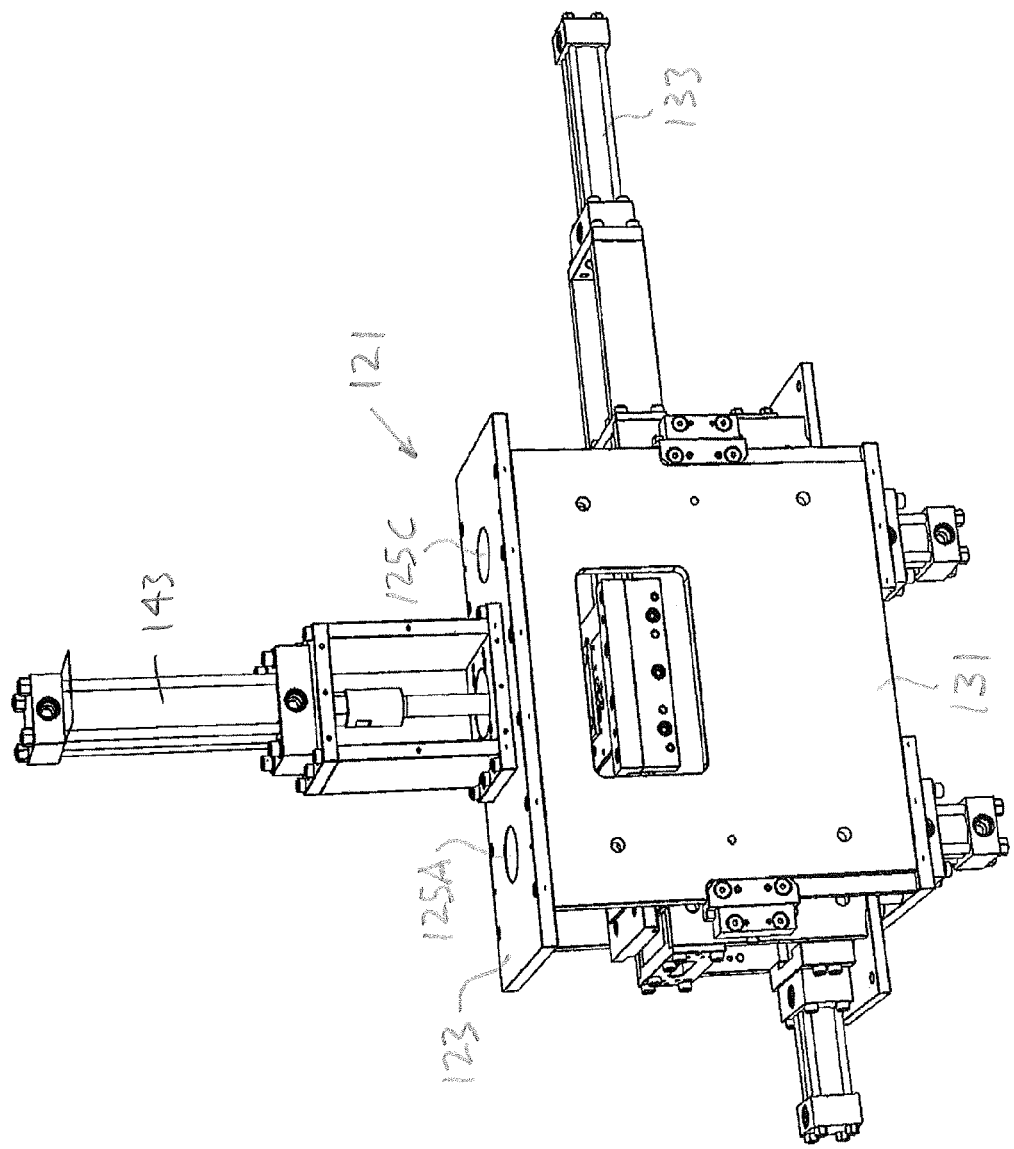
FIG. 8A is an isometric view of an embodiment of the second compression assembly of the invention, drawn at a smaller scale.
Figure 8B:
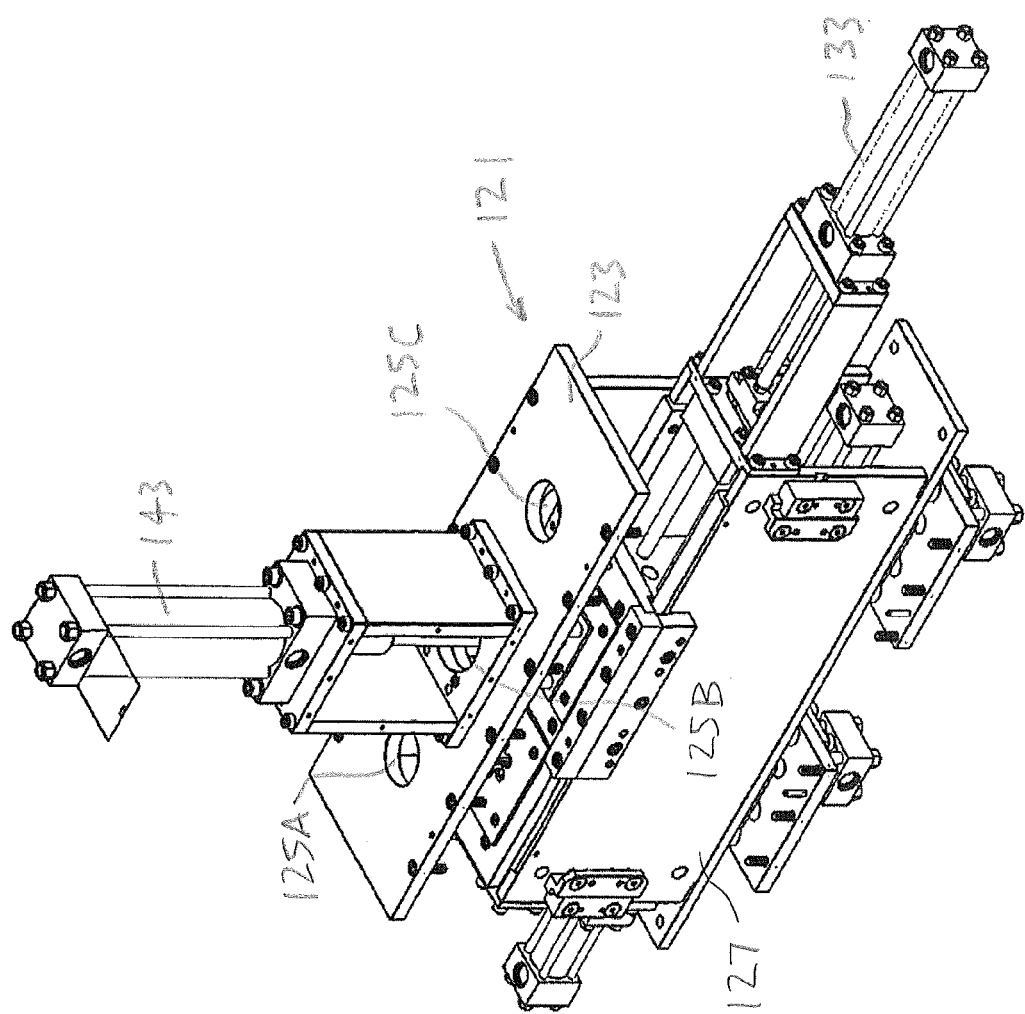
FIG. 8B is an isometric view of the second compression assembly of FIG. 8A, with certain elements omitted.

As can be seen in FIG. 8A, in one embodiment, the shuttle assembly 121 is formed to cooperate with the second compression assembly 142. The second piston 148 of the second compression assembly 142 is mounted to a hydraulic ram 143. Preferably, the shuttle assembly 121 includes an upper plate 123 to which the hydraulic ram 143 preferably is secured. As can be seen, for example, in FIGS. 8B and 8D, the top plate preferably includes openings 125A, 125B, 125C therein. The shuttle assembly 121 preferably includes a shuttle housing 127 in which a movable shuttle base 129 (FIG. 8D) is movable. As can be seen in FIG. 8D, the second cylinders 144A, 144B preferably are secured to the shuttle base 129. It is also preferred that the second cylinders 144A, 144B are positioned beside each other on the shuttle base 129. In FIG. 8D, it can be seen that the second cylinders 144A, 144B are secured in position relative to each other on the base 129, and do not move relative to each other.

Figure 8C:
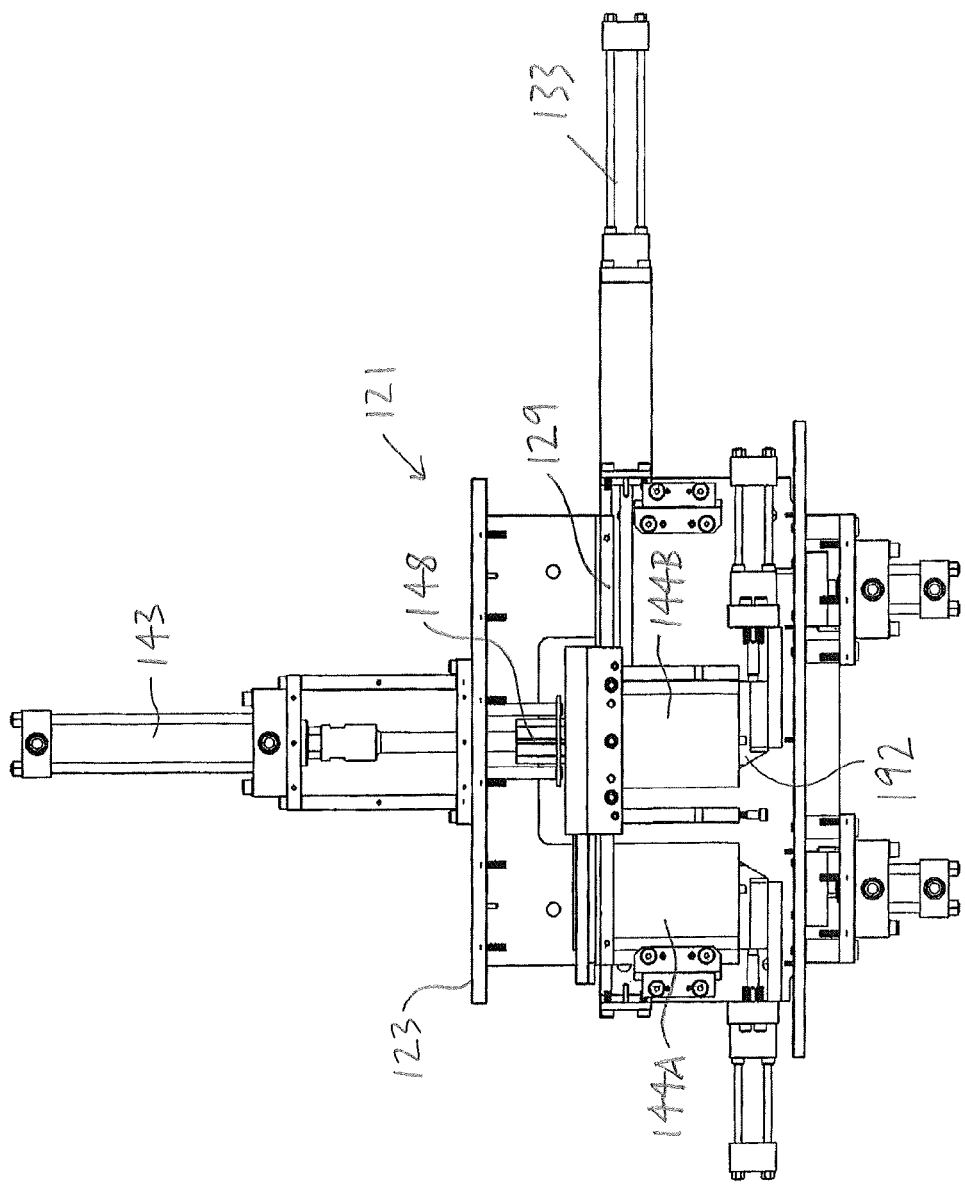
FIG. 8C is a side view of the second compression assembly of FIG. 8A, with certain additional elements omitted.
Figure 8D:
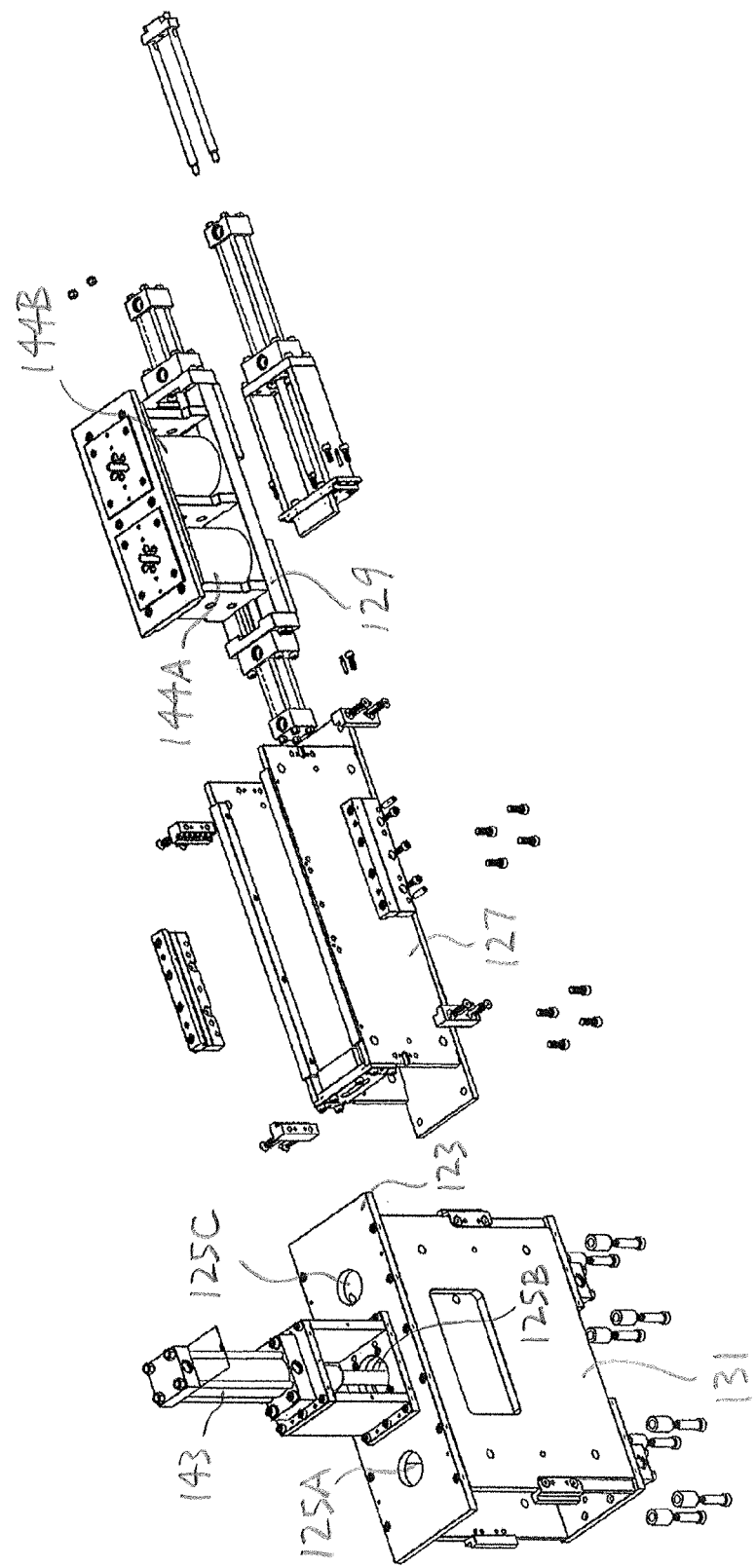
FIG. 8D is an exploded view of the second compression assembly of FIG. 8A.

In FIG. 8C, the shuttle assembly 121 is illustrated, with certain parts omitted for clarity of illustration. As illustrated in FIG. 8C, the shuttle base 129 is positioned so that the second cylinder 144A is vertically aligned with the opening 125A, and the second cylinder 144B is vertically aligned with the second opening 125B. It can be seen that the second cylinder 144A is positioned in its first position in FIG. 8C, and the second cylinder 144B is positioned in its second position, in FIG. 8C. The positioning of the second cylinders 144A, 144B therefore corresponds to that schematically illustrated in FIG. 7. It will be understood that, when the second cylinders 144A, 144B are positioned as illustrated in FIG. 8C, the second cylinder 144A is positioned to receive the preliminary element from the first compression assembly 130A (not shown in FIG. 8C). As described above, the preliminary element falls into the second cylinder 144A from the first compression assembly 130B under the influence of gravity.

Similarly, it will be understood that, in FIG. 8C, the second cylinder 144B includes the preliminary element therein, for compression by the second piston 148, when the second piston 148 is pressed downwardly by the ram 143 upon the preliminary element, to form the solid fuel element in the second cylinder 144B. As described above, the solid fuel element thus formed exits the second cylinder 144B under the influence of gravity once an end gate 192 (FIG. 8C) is removed.

The shuttle assembly 121 preferably includes a hydraulic cylinder 133 for moving the second cylinder 144A, and the second cylinder 144B, between their respective first and second positions. As described above, the second cylinders 144A, 144B are fixed in position relative to each other on the base 129. The base 129 to which they are secured is moved laterally by the hydraulic cylinder 133.

Accordingly, once the second cylinder 144A is ready to move to its second position and the second cylinder 144B is ready to move to its first position, the hydraulic cylinder 133 moves the base 129 accordingly. It will be understood that, when the second cylinder 144A is in its second position, the second cylinder 144A is vertically aligned with the opening 125B, and also with the second piston 148. Similarly, it will be understood that when the second cylinder 144B is in its first position, the second cylinder 144B is vertically aligned with the opening 125C. When the second cylinder 144B is in its first position, it is also vertically aligned with the first compression assembly 130B (not shown in FIGS. 8A-8C).

It will be appreciated by those skilled in the art that the invention can take many forms, and that such forms are within the scope of the invention as claimed. The scope of the claims should not be limited by the preferred embodiments set forth in the examples, but should be given the broadest interpretation consistent with the description as a whole.

What is claimed is:

1. A method of forming a solid fuel element having a mass comprising a woody biomass component and a binder component, the method comprising the following steps:
    (a) providing the woody biomass component, the woody biomass component comprising a plurality of woody biomass particles;
    (b) providing the binder component, the binder component comprising a plurality of binder particles;
    (c) forming an uncompressed mixture comprising at least about 70% and at most about 80% by weight of the woody biomass component, and at least about 20% and at most about 30% by weight of the binder component;
    (d) heating the uncompressed mixture to a preselected temperature that is greater than a glass transition temperature of the binder component and less than a melting temperature of the binder component;
    (e) providing a first compression assembly comprising a first cylinder comprising a first chamber therein and a first piston movable in the first cylinder;
    (f) via a fine metering assembly, delivering the mass of the uncompressed mixture to the first chamber;
    (g) with the first compression assembly, compressing the mass of the uncompressed mixture to provide a preliminary element comprising a first compressed mixture having a preliminary density that is less than 1.0 g/cc;
    (h) heating the first compressed mixture to the preselected temperature;
    (i) providing a second compression assembly comprising a second cylinder comprising a second chamber therein and a second piston movable in the second cylinder;
    (j) positioning the preliminary element in the second chamber;
    (k) compressing the preliminary element in the second chamber to form the solid fuel element having a density that is greater than the preliminary density; and
    (l) removing the solid fuel element from the second chamber.

2. The method of claim 1 in which, in step (c), the uncompressed mixture has a moisture content of at least 10% by weight of the uncompressed mixture.

3. The method according to claim 1 in which, in step (k), during the compression of the preliminary element in the second chamber, the preliminary element is heated to a temperature that is at least equal to the melting temperature of the binder component.

4. The method according to claim 1 in which the mass of the uncompressed material is delivered to the first chamber in three separately delivered portions, and each said portion is compressed in the first chamber consecutively to form the preliminary element.

5. The method of claim 1 in which, in step (g), the uncompressed mixture is subjected to a first compression force of approximately 3.15 tonne per square meter (approximately 2 long tons per square inch) in the first chamber for a first compression period.

6. The method of claim 1 in which, in step (k), the preliminary element is subjected to a second compression force of approximately 4.275 tonne per square meter (approximately 3 long tons per square inch) in the second chamber for a second compression period.

7. A method according to claim 1 in which:
the woody biomass particles in the uncompressed mixture define a plurality of interstices therebetween;
the binder component in the uncompressed mixture, when heated to the preselected temperature, is flowable into the interstices to at least partially fill the interstices, when the uncompressed mixture is compressed to form the first compressed mixture.

8. A method according to claim 7 in which, when the first compressed mixture of the preliminary element is heated to the preselected temperature, the binder component flows into the interstices between the particles of the woody biomass component, and the binder component fills the interstices.

9. A method according to claim 1 in which the binder component is selected from the group consisting of non-hazardous polyethylene and paraffin.

10. A method according to claim 1 in which the density of the solid fuel element is greater than 1.0 g/cc.

11. A method according to claim 10 in which the density of the solid fuel element is between 1.035 g/cc and 1.065 g/cc.

12. A method according to claim 1 in which the amount of the uncompressed mixture that is delivered to the first chamber is between 150 grams and 160 grams.

13. A method according to claim 1 in which the woody biomass particles have a particle size distribution of less than 0.25 inches.

14. A method according to claim 1 in which the binder particles have a particle size distribution that is up to 0.012 inches.

* * * * *